(12) United States Patent
Suzuki

(10) Patent No.: US 8,643,473 B2
(45) Date of Patent: Feb. 4, 2014

(54) SIGNAL PROCESSING APPARATUS AND SIGNAL PROCESSING METHOD

(75) Inventor: Takahiro Suzuki, Kanagawa (JP)

(73) Assignee: Sony Corporation (JP)

( * ) Notice: Subject to any disclaimer, the term of this patent is extended or adjusted under 35 U.S.C. 154(b) by 219 days.

(21) Appl. No.: 13/065,528

(22) Filed: Mar. 23, 2011

(65) Prior Publication Data

US 2011/0241837 A1 Oct. 6, 2011

(30) Foreign Application Priority Data

Mar. 31, 2010 (JP) .................................. 2010-083163

(51) Int. Cl.
*H04Q 5/22* (2006.01)

(52) U.S. Cl.
USPC ...... 340/10.1; 340/572.7; 340/10.3; 455/41.1

(58) Field of Classification Search
USPC ......... 340/10.1, 10.2, 10.3, 10.33, 10.4, 10.5, 340/572.1, 572.3, 572.7, 572.8, 870.02, 340/870.19
See application file for complete search history.

(56) References Cited

U.S. PATENT DOCUMENTS

| | | | |
|---|---|---|---|
| 2008/0070003 A1* | 3/2008 | Nakatani et al. ............... | 428/141 |
| 2009/0045919 A1* | 2/2009 | Fukui et al. .................. | 340/10.1 |
| 2009/0219138 A1* | 9/2009 | Forster ......................... | 340/10.1 |

FOREIGN PATENT DOCUMENTS

| | | |
|---|---|---|
| JP | 2000-138621 A | 5/2000 |
| JP | 2005-323019 A | 11/2005 |
| JP | 2008-306689 A | 12/2008 |

* cited by examiner

*Primary Examiner* — Nabil Syed
(74) *Attorney, Agent, or Firm* — Lerner, David, Littenberg, Krumholz & Mentlik, LLP

(57) ABSTRACT

There is provided a signal processing apparatus, including a first antenna to perform non-contact communication with a reader writer, a second antenna installed adjacent to the first antenna to perform the non-contact communication with a non-contact communication apparatus, a metal body that is arranged between the first antenna and the second antenna and blocks a magnetic field between the first antenna and the second antenna, an amplification unit that amplifies a carrier wave by using at least external power supplied from an external power supply, a modulation unit that modulates the carrier wave, and a load modulation unit that changes an impedance of the first antenna.

6 Claims, 8 Drawing Sheets

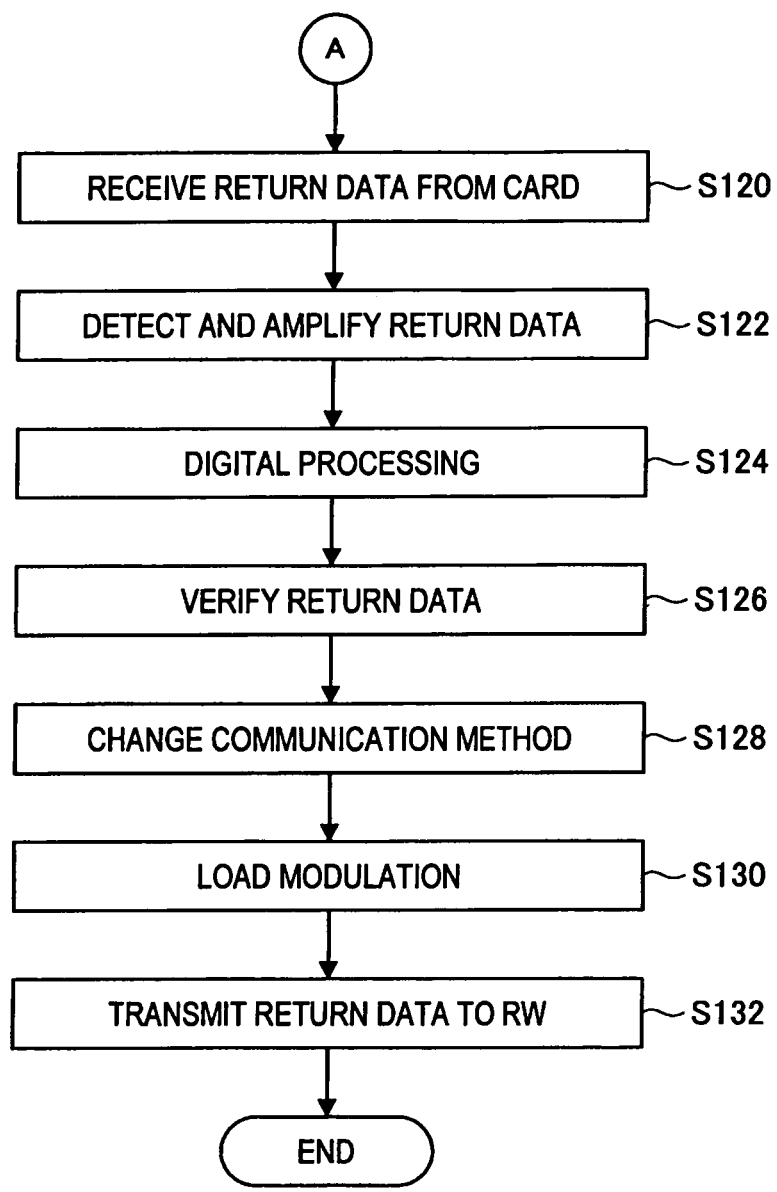

SIGNAL PROCESSING APPARATUS AND SIGNAL PROCESSING METHOD

CROSS-REFERENCE TO RELATED APPLICATION

The present application claims priority from Japanese Patent Application No. JP 2010-083163 filed in the Japanese Patent Office on Mar. 31, 2010, the entire content of which is incorporated herein by reference.

BACKGROUND OF THE INVENTION

1. Field of the Invention

The present invention relates to a signal processing apparatus and a signal processing method.

2. Description of the Related Art

A communication system that performs non-contact communication of data between a non-contact IC card and a reader writer is used for various purposes such as a settlement terminal of a shop, an entry/departure control terminal of an office, and an automatic ticket examination of transportation facilities. To change such an installed and operated communication system as a whole or to change communication performance of a reader writer, a heavy investment in terms of cost and work load such as a modification or replacement of the reader writer and technical examination thereafter is necessary.

If, for example, the communication distance of a reader writer installed in a shop should be extended or a communication area should be expanded in a horizontal direction, it is necessary to take action of replacing or modifying the reader writer. However, when an existing reader writer is replaced, there are issues of rising replacement costs and the loss of compatibility of the communication interface between the reader writer and a host apparatus. When a reader writer is modified, it is necessary to take an electromagnetic influence caused by an analog circuit inside the reader writer or the environment around the reader writer into consideration, which produces an issue that technical restrictions and items to be examined arise for modification.

Thus, Japanese Patent Application Laid-Open Nos. 2005-323019, 2008-306689, and 2000-138621 propose to arrange a booster antenna including a resonant antenna coil opposite to a reader writer antenna to extend the communication distance of an existing reader writer or to expand a communication area. With Q (Quality factor) of a resonance circuit intensified by resonating a magnetic field between the reader writer and a non-contact IC card by the booster antenna, the communication distance of the reader writer is extended.

SUMMARY OF THE INVENTION

However, the technology to extend the communication distance of a reader writer by using a booster antenna in the related art described in Japanese Patent Application Laid-Open Nos. 2005-323019, 2008-306689, and 2000-138621 has issues described below.

First, the booster antenna in the related art amplifies the magnetic field of a reader writer by electromagnetic coupling and the resonance phenomenon between antenna coils. Thus, an issue that the communication distance of the reader writer becomes shorter originating from an external metal body or antenna coil conditions (for example, an inductance L or capacitance C of the antenna or a coupling coefficient K (d) determined by antenna arrangement) could arise. The reason therefor is that a decrease in magnetic flux (eddy current) caused by the external metal body, a shift of the resonance frequency between antenna coils (degradation in resonance), a decrease in electromagnetic coupling of antenna coils and the like adversely affect the communication distance of the reader writer.

Second, in the booster antenna in the related art, it is necessary to measure the resonance frequency of an antenna coil of an existing reader writer, inductance, capacitance, antenna shape, and degree of coupling and to design the inductance L, capacitance C, coupling coefficient K (d), and resonance frequency of the booster antenna based on results of the measurement. Thus, it is difficult to decide each design value based on the booster antenna alone and adjustments in accordance with measured values of the existing reader writer or a non-contact IC card become necessary. Therefore, it becomes necessary to install a booster antenna individually designed and adjusted for each existing reader writer and each non-contact IC card so that installation work will be complicated and difficult.

Third, the booster antenna in the related art extends the communication distance of a reader writer by using intensification of a resonance circuit between antenna coils or coupling coefficient and thus, there is an issue that the effect of extending the communication distance is low. According to technology described in Japanese Patent Application Laid-Open No. 2008-306689, for example, the communication distance can be extended only by several to 15 mm. Further, if the resonance circuit is already maximally adjusted between a reader writer and a non-contact IC card, it is naturally difficult to extend the communication distance and arrangement work of a booster antenna may realistically become difficult.

In light of the foregoing, it is desirable to provide a novel and improved signal processing apparatus and signal processing method that can easily be installed on an existing reader writer and are capable of extending the communication distance easily and adequately.

According to an embodiment of the present invention, there is provided a signal processing apparatus arranged between a reader writer and a non-contact communication apparatus performing non-contact communication with the reader writer, including a first antenna to perform the non-contact communication with the reader writer, a second antenna installed adjacent to the first antenna to perform the non-contact communication with the non-contact communication apparatus, a metal body that is arranged between the first antenna and the second antenna and blocks a magnetic field between the first antenna and the second antenna, an amplification unit that amplifies a carrier wave by using at least external power supplied from an external power supply, a modulation unit that modulates the carrier wave, and a load modulation unit that changes an impedance of the first antenna, wherein the signal processing apparatus receives a first carrier wave modulated with first data transmitted to the non-contact communication apparatus from the reader writer by using the first antenna, generates a second carrier wave by amplifying the first carrier wave by the amplification unit, modulates the second carrier wave with the first data by the modulation unit, transmits the second carrier wave modulated with the first data to the non-contact communication apparatus by using the second antenna, receives second data returned by load modulation of an antenna of the non-contact communication apparatus from the non-contact communication apparatus by using the second antenna, and transmits the second data to the reader writer by performing the load modulation that changes the impedance of the first antenna by the load modulation unit based on the second data.

The signal processing apparatus may include a digital processing unit that digitally processes the first data and the second data, wherein the digital processing unit changes a communication method of the first data received from the reader writer from a first communication method supported by the reader writer to a second communication method supported by the non-contact communication apparatus and changes the communication method of the second data received from the non-contact communication apparatus from the second communication method supported by the non-contact communication apparatus to the first communication method supported by the reader writer.

The signal processing apparatus may include a detection unit that detects a signal of the second data generated in the second antenna by the load modulation of the antenna of the non-contact communication apparatus, and a receiving amplification unit that amplifies the signal of the second data detected by the detection unit. The signal processing apparatus may receive performance of the second data by the detection unit and the receiving amplification unit is adjusted to be higher than the receiving performance of the second data by the reader writer.

A degree of modulation when the second carrier wave is modulated with the first data by the modulation unit may be adjusted to be different from a degree of modulation when the first carrier wave is modulated with the first data by the reader writer in accordance with an environment in which the signal processing apparatus is used or specifications of the non-contact communication apparatus.

The signal processing apparatus may include a first magnetic body arranged between the first antenna and the metal body.

The signal processing apparatus may include a second magnetic body arranged between the second antenna and the metal body.

The signal processing apparatus may include a rectifying unit that rectifies the first carrier wave received by the first antenna. The amplification unit may amplify the first carrier wave by using the external power and internal power which is obtained by rectifying the first carrier wave by the rectifying unit.

The signal processing apparatus may be arranged such that communication surfaces of the first and second antennas are tilted with respect to the communication surface of the antenna of the reader writer.

According to another embodiment of the present invention, there is provided a signal processing method by a signal processing apparatus arranged between a reader writer and a non-contact communication apparatus performing non-contact communication with the reader writer, including the steps of receiving a first carrier wave modulated with first data transmitted from the reader writer to the non-contact communication apparatus by using a first antenna, generating a second carrier wave by amplifying the first carrier wave by using at least external power supplied from an external power supply, modulating the second carrier wave with the first data, transmitting the second carrier wave modulated with the first data to the non-contact communication apparatus by using a second antenna installed adjacent to the first antenna such that a metal body is present between the first antenna and the second antenna, receiving second data returned by load modulation of an antenna of the non-contact communication apparatus from the non-contact communication apparatus by using the second antenna, and transmitting the second data to the reader writer by performing the load modulation that changes an impedance of the first antenna based on the second data.

According to the above configuration, in a signal processing apparatus, a first carrier wave modulated with first data is received from a reader writer by using a first antenna, a second carrier wave is generated by the first carrier wave being amplified by using external power, the second carrier wave is modulated with the first data contained in the first carrier wave, the second carrier wave modulated with the first data is transmitted to the non-contact communication apparatus by using a second antenna, second data returned by load modulation of an antenna of the non-contact communication apparatus is received from the non-contact communication apparatus by using the second antenna, and the second data is transmitted to the reader writer by performing the load modulation that changes an impedance of the first antenna based on the second data. Accordingly, the signal processing apparatus can retransmit transmission data transmitted from the reader writer to the non-contact communication apparatus by using the second carrier wave whose magnetic field intensity is stronger than that of the first carrier wave to the non-contact communication apparatus and re-return return data returned from the non-contact communication apparatus to the reader writer by the same method as used for the non-contact communication apparatus. Thus, the signal processing apparatus can extend the communication distance between the reader writer and the non-contact communication apparatus by suitably relaying communication therebetween.

According to the present invention, as described above, installation on an existing reader writer is easy and the communication distance of the existing reader writer can be extended easily and adequately.

BRIEF DESCRIPTION OF THE DRAWINGS

FIG. 6B is a flowchart showing the signal processing method by the signal processing apparatus according to the embodiment.

DETAILED DESCRIPTION OF THE EMBODIMENT

Figure 1:
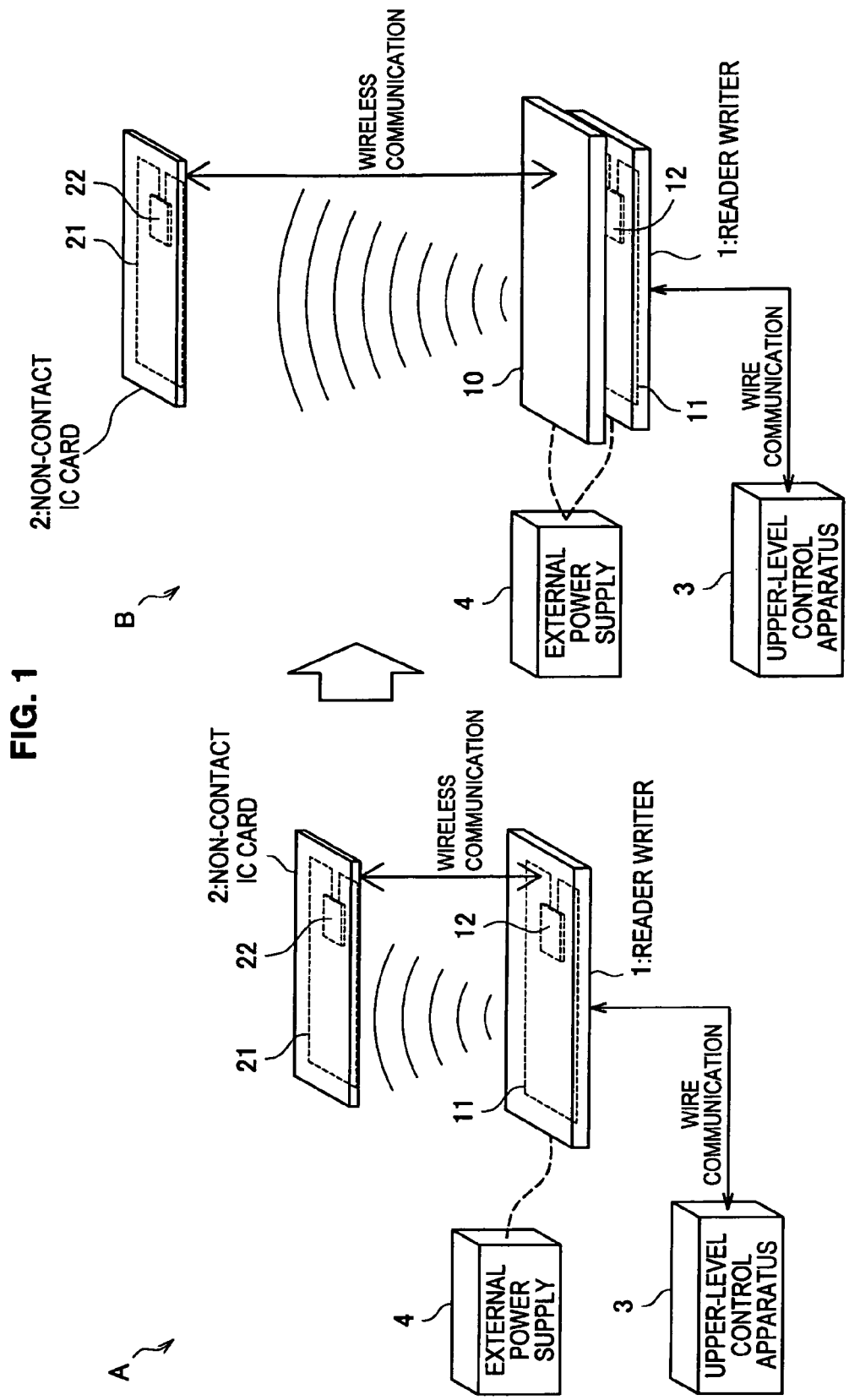
FIG. 1 is a schematic diagram showing a communication system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be provided in the following order.

1. Overview of Non-Contact Communication System
2. Configuration of Reader Writer and Non-Contact IC Card
3. Configuration of Signal Processing Apparatus
3.1. Antenna Configuration of Signal Processing Apparatus
3.2. Power Supply Configuration of Signal Processing Apparatus
3.3. Configuration of Communication Function of Signal Processing Apparatus
3.4. Changes of Communication Specifications of Reader Writer by Signal Processing Apparatus
4. Signal Processing Method
5. Application Example
6. Conclusion

1. OVERVIEW OF NON-CONTACT COMMUNICATION SYSTEM

First, an outline configuration of a communication system using a signal processing apparatus according to a first embodiment of the present invention will be described with reference to FIG. 1. FIG. 1 is a schematic diagram showing a communication system according to the present embodiment.

As shown in FIG. 1, the communication system according to the present embodiment is a system to perform non-contact communication between a reader writer 1 and a non-contact communication apparatus such as a non-contact IC card 2. Non-contact communication is near field communication (NFC) using a high-frequency magnetic field of a predetermined frequency (for example, 13.56 MHz or 4.915 MHz) as a medium. The non-contact communication includes, for example, the intimate type whose communication distance is up to 2 mm (international standard: ISO/IEC10536), the proximity type whose communication distance is several to 10 cm (international standard: ISO/IEC14443), and the vicinity type whose communication distance is 50 cm to 1 m (international standard: ISO/IEC15693).

In the description that follows, the non-contact IC card 2 is used as a proximity type non-contact communication apparatus, which is the type most frequently used, but the present invention is not limited to such an example. A non-contact communication apparatus according to the embodiment of the present invention can be applied to any electronic device such as an RFID tag, mobile terminal (for example, a portable music/video player, portable game machine, IC recorder, and PDA), game machine, imaging apparatus (for example, a digital camera and digital camcorder), electronic purse, and personal computer as long as a non-contact communication function using a non-contact communication circuit and an antenna coil is included.

As shown in FIG. 1A, the reader writer 1 is an apparatus to read data from the non-contact IC card 2 or to write data into the non-contact IC card 2 by performing non-contact communication with the non-contact IC card 2. The reader writer includes an antenna 11 to perform non-contact communication with the non-contact IC card 2 and an RF board 12 connected to the antenna 11. The antenna 11 is, for example, a loop antenna including a metallic antenna coil and generates an electromagnetic field, which becomes an RF signal.

The reader writer 1 is connected to a higher-level control apparatus (host apparatus) 3 by wire and also connected to an external power supply 4 such as an AC power supply and batteries. The reader writer 1 is controlled by the higher-level control apparatus 3 and performs a communication operation using power from the external power supply 4. With the increasing variety of uses of the non-contact IC card 2, types of the higher-level control apparatus (host apparatus) 3 on which the reader writer 1 is mounted also increase. The higher-level control apparatus 3 is used as a variety of terminal apparatuses such as an automatic ticket gate, accounting apparatus installed in a shop, entry/departure control apparatus, personal computer, home information equipment, mobile terminal, vending machine of various goods and tickets, POS terminal, kiosk terminal, and ATM of financial institutions. The reader writer 1 may be contained in the higher-level control apparatus 3 or externally attached thereto.

The non-contact IC card 2 is a card-type non-contact communication apparatus with a size that can be carried by the user. The non-contact IC card 2 includes an antenna 21 to perform non-contact communication with the reader writer 1 and an IC chip 22 on which an integrated circuit (IC) capable of performing predetermined arithmetic operations is mounted within a thin outer jacket of the card. Like the antenna 11 of the reader writer 1, the antenna 21 of the non-contact IC card 2 is, for example a loop antenna of a metallic antenna coil.

The non-contact IC card 2 can perform non-contact communication with the reader writer 1 using an electromagnetic wave. Thus, the reader writer 1 can read/write data from/into the non-contact IC card 2 by positioning the non-contact IC card within a communicable range of the reader writer 1 (within coverage of an electromagnetic wave emitted by the reader writer 1), that is, only by holding the non-contact IC card 2 over the reader writer 1. The non-contact IC card 2 has advantages of ease of use because data communication can be performed only by holding the non-contact IC card 2 over the reader writer 1, being able to transmit/receive data swiftly, high-level security due to difficulty of modification/alteration, and being able to reuse as many times as possible only by rewriting data. Thus, the variety of uses of the non-contact IC card 2 is increasing and is used, for example, as an electronic money card, transportation facilities card, personal authentication card, point card, coupon card, electronic ticket card, and electronic settlement card.

Non-contact communication performed between the reader writer 1 and the non-contact IC card 2 is proximity wireless communication of, for example, about several to 10 cm. Such non-contact communication is symmetric communication in which, for example, the frequency band of a predetermined frequency (for example, 13.56 MHz) is used as a carrier (carrier wave), communication is performed at the communication speed of 212 kbps, and no sub-carrier is used. For example, the ASK (Amplitude Shift Keying) modulation method can be used as the modulation method and, for example, the Manchester encoding method can be used as the encoding method. Through such non-contact communication, for example, the reader writer 1 issues various commands to the non-contact IC card 2 in accordance with instructions from the higher-level control apparatus 3 and the non-contact IC card 2 responds to such commands to repeat transactions in this manner, whereby information about a specific service is transmitted/received.

A non-contact communication operation between the reader writer 1 and the non-contact IC card 2 will be described. First, the RF board 12 of the reader writer 1 modules a carrier including, for example, high-frequency electromagnetic waves of 13.56 MHz by transmission data and transmits the modulated carrier by using the antenna 11. The transmission data is data (first data) transmitted from the reader writer 1 to the non-contact IC card 2 and, for example, a variety of commands or service data.

Next, the IC chip 22 of the non-contact IC card 2 receives the carrier transmitted from the reader writer 1 through the antenna 21 and uses a DC component of a received voltage induced in the antenna 21 as a driving voltage to extract an AC component of the received voltage as transmission data. Then, the IC chip 22 of the non-contact IC card 2 performs predetermined processing based on the transmission data to generate return data to be returned to the reader writer 1. The return data is data (second data) returned from the non-contact IC card 2 to the reader writer 1 and, for example, a variety of commands or service data.

Further, the IC chip 22 of the non-contact IC card 2 performs load modulation that changes (for example, turns on/off) the impedance (load) of the antenna 21 based on the transmission data. As a result, a demagnetizing field is generated by a current flowing through the antenna 21 of the non-contact IC card 2 and when the demagnetizing field passes through the antenna 11 of the reader writer 1, the field is converted into a current, which is superimposed on the current flowing through the antenna 11. By detecting fine changes in current flowing through the antenna 11, the RF board 12 of the reader writer 1 can obtain return data from the non-contact IC card 2.

Thus, the non-contact IC card 2 uses power obtained by converting an electromagnetic field of a carrier generated from the reader writer 1 as a power supply and also returns a response signal (return data) to the reader writer 1 by load modulation using the antenna 21. Thus, the non-contact IC card 2 can communicate with the reader writer 1 without a power supply.

In the communication system described above, the communication distance between the reader writer 1 and the non-contact IC card 2 is extended if magnetic field intensity of the carrier transmitted from the antenna 11 of the reader writer 1 is increased. However, as shown in FIG. 1A, the communication distance of the existing reader writer 1 is limited by communication performance (for example, specs of an amplifier circuit of the RF board 12 and Q or inductance of the antenna 11) of the reader writer 1 and can communicate only with the non-contact IC card 2 positioned within a predetermined communication distance (for example, 50 mm). Modification/alteration of the reader writer 1 can be considered as a method of retroactively improving the communication distance of the existing reader writer 1, but in such a case, costs involved in the modification/alteration will increase.

Thus, in the present embodiment, as shown in FIG. 1B, a signal processing apparatus 10 is retroactively installed additionally near the existing low-performance reader writer 1 to increase communication performance of the reader writer 1 without modifying or replacing the existing reader writer 1. The signal processing apparatus 10 is an adaptor-type communication assistance processing apparatus retroactively installed additionally for the existing reader writer 1. The signal processing apparatus 10 has a function to assist communication between the existing reader writer 1 and the non-contact IC card and a function to change communication performance (for example, the communication distance, receiving performance, and modulation degree of transmission data) and the communication method (for example, communication specifications and the bit rate) of the reader writer 1.

The signal processing apparatus 10 is installed within the communicable range of the reader writer 1. In this case, the signal processing apparatus 10 may be installed on the reader writer 1 in contact with the outer jacket of the reader writer 1 or arranged apart from the outer jacket of the reader writer 1 by a predetermined distance. Further, the signal processing apparatus 10 is connected to the external power supply 4 and operates by using power supplied from the external power supply 4. In the present embodiment, the reader writer 1 and the signal processing apparatus 10 are connected to the same external power supply 4, but may be connected to different power supplies.

The signal processing apparatus 10 has both the function to perform non-contact communication with the reader writer 1 and the function to perform non-contact communication with the non-contact IC card 2 held over the signal processing apparatus 10. Thus, the signal processing apparatus 10 includes a first antenna to perform non-contact communication with the reader writer 1 and a second antenna to perform non-contact communication with the non-contact IC card 2 (see FIGS. 4 to 6 described later). The signal processing apparatus 10 has a function to relay non-contact communication between the reader writer 1 and the non-contact IC card 2 by performing non-contact communication with the reader writer 1 and the non-contact IC card 2 independently using both antennas.

More specifically, the signal processing apparatus 10 first receives a first carrier (first carrier wave) modulated with transmission data from the reader writer 1 to the non-contact IC card 2 by using the first antenna and demodulates the first carrier to obtain the transmission data. Next, the signal processing apparatus 10 amplifies a signal of the first carrier to generate a signal of a second carrier (second carrier wave) and transmits an RF signal obtained by modulating the second carrier with the transmission data to the non-contact IC card 2 by using the second antenna. Further, when return data to the transmission data is transmitted by load modulation from the non-contact IC card 2, the signal processing apparatus 10 receives the return data by using the second antenna and performs load modulation of the first antenna based on the return data to return the return data to the reader writer 1.

Thus, the signal processing apparatus 10 retransmits transmission data transmitted from the reader writer 1 to the non-contact IC card 2 (repeat transmission) and also re-returns return data returned from the non-contact IC card 2 to the reader writer 1 (repeat return). At this point, the signal processing apparatus 10 uses power from the external power supply 4 to amplify the first carrier from the reader writer 1 and transmits the second carrier with high magnetic field intensity to the non-contact IC card 2. Accordingly, the signal processing apparatus 10 can extend the communication distance of the reader writer 1 by reinforcing communication performance of the reader writer 1. If, for example, as shown in FIG. 1A, the communication distance of the existing reader writer 1 is 50 mm, as shown in FIG. 1B, the communication distance of the reader writer 1 can be extended by 100 mm or more by simply installing the signal processing apparatus 10 near the reader writer 1.

The signal processing apparatus 10 according to the present embodiment can, as described above, actively change communication performance of the reader writer 1 using the external power supply 4. Therefore, communication performance and the communication method of the existing reader writer 1 can easily be changed by simply installing the signal processing apparatus 10 near the reader writer 1 regardless of specs (for example, the inductance and capacitance of antennas) of the reader writer 1 and the non-contact IC card 2 and the resonance frequency.

Thus, the signal processing apparatus 10 according to the present embodiment is an active apparatus that independently changes communication performance and the communication method of the reader writer 1 by being interposed between the reader writer 1 and the non-contact IC card 2 and relaying RF signals of both, and includes a control circuit such as an IC to execute the change function. In contrast, the booster antenna in the related art described in Japanese Patent Application Laid-Open Nos. 2005-323019, 2008-306689, and 2000-138621 is a passive apparatus including only simple electric components (inductors and capacitors to extend the communication distance by using the resonance phenomenon between the reader writer 1 and the non-contact IC card 2 and the like) and is different from the signal processing apparatus 10 according to the present embodiment. Details of the configuration of the signal processing apparatus 10 according to the present embodiment will described later.

2. CONFIGURATION OF READER WRITER AND NON-CONTACT IC CARD

Figure 2:
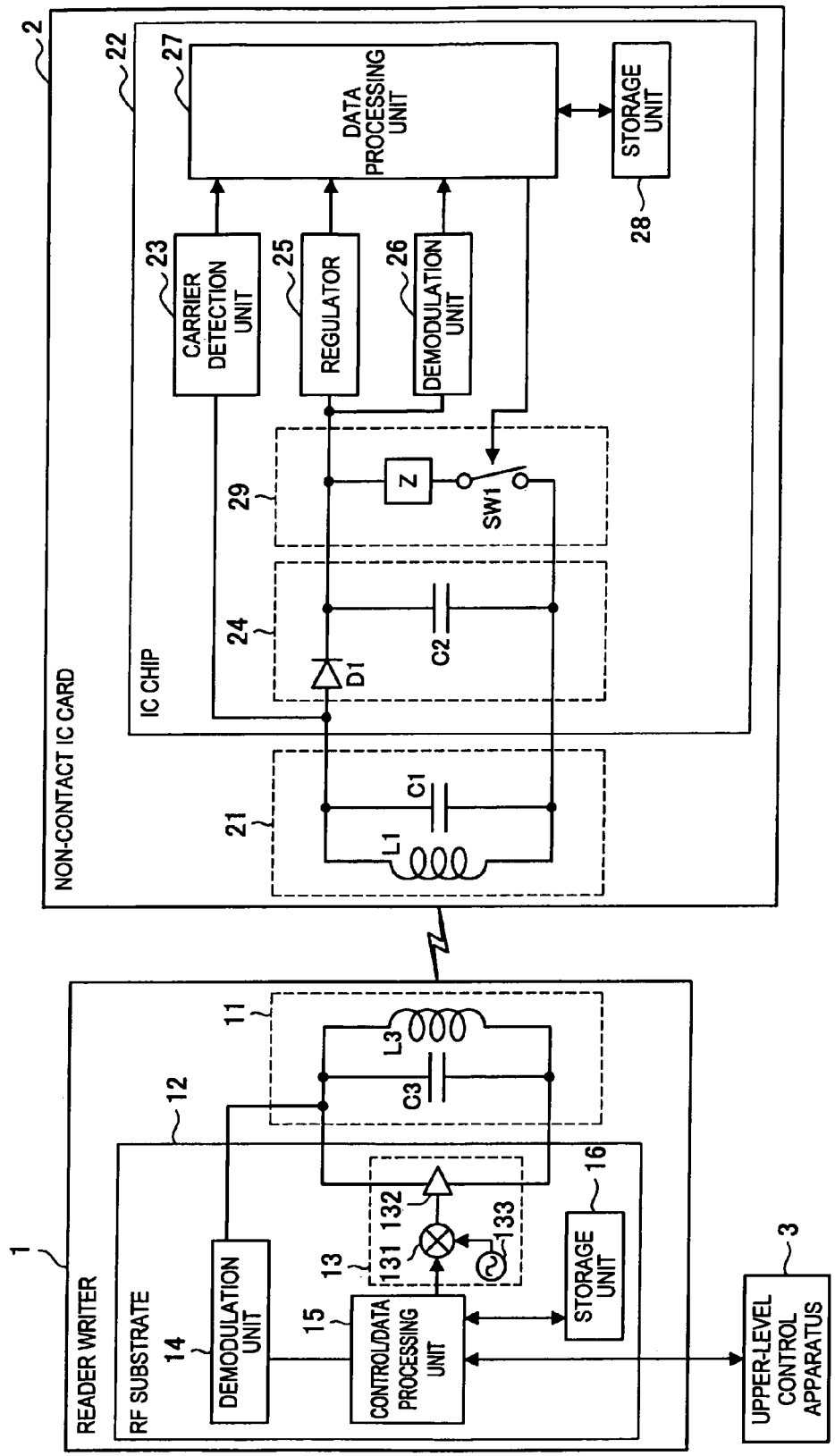
FIG. 2 is a circuit block diagram showing a reader writer and a non-contact IC card according to the embodiment.

Next, the configuration of the reader writer 1 and the non-contact IC card 2 according to the present embodiment will be described in detail with reference to FIG. 2. FIG. 2 is a circuit block diagram showing the reader writer 1 and the non-contact IC card 2 according to the present embodiment.

First, the configuration of the reader writer 1 will be described. As shown in FIG. 2, the reader writer 1 roughly includes the antenna 11 and the RF board 12.

The antenna 11 is configured by, for example, a loop antenna to transmit/receive an RF signal and includes a coil L3 (inductor) having a predetermined inductance and a capacitor C3 having a predetermined capacitance. The antenna 11 transmits a carrier corresponding to a carrier signal generated by a carrier signal generating unit 13 to the non-contact IC card 2 and receives a response signal from the non-contact IC card 2. The antenna 11 in the example of FIG. 2 is configured by a resonance circuit including the coil L3 and the capacitor C3, but may further include a resistor R.

Next, each unit of the RF board 12 of the reader writer 1 will be described. The RF board 12 includes the carrier signal generating unit 13, a demodulation unit 14, a control/data processing unit 15, and a storage unit 16.

The carrier signal generating unit 13 receives a carrier signal generating instruction from the control/data processing unit 15 and generates a carrier signal in accordance with the instruction. In the example of FIG. 2, the carrier signal generating unit 13 includes a modulating circuit 131 that performs ASK modulation of a carrier signal from an oscillator 133 by transmission data and an amplifier circuit 132 that amplifies the carrier signal output from the modulating circuit 131. A carrier signal generated by the carrier signal generating unit 13 may contain, for example, various processing instructions to the non-contact IC card 2 and data (transmission data) to be processed.

The demodulation unit 14 demodulates a response signal from the non-contact IC card 2 by performing envelope detection of changes in amplitude of the voltage at an antenna edge of the antenna 11 and binarizing the detected signal through an amplifier. The demodulation unit 14 can also demodulate a response signal by using, for example, changes in phase of the voltage at an antenna edge of the antenna 11. Though not shown in FIG. 2, a filter circuit to perform filtering may be provided between the antenna 11 and the demodulation unit 14.

The control/data processing unit 15 is configured by, for example, a processor such as an MPU (Micro Processing Unit). The control/data processing unit 15 is connected to, for example, the higher-level control apparatus 3 and controls various operations of the reader writer 1 in accordance with instructions from the higher-level control apparatus 3. The control/data processing unit 15 also transmits data demodulated by the demodulation unit 14 to the higher-level control apparatus 3 and generates a carrier signal generating instruction based on the data.

The storage unit 16 stores various kinds of data such as programs to operate the control/data processing unit 15, data acquired from the higher-level control apparatus 3 or the non-contact IC card 2, and data operated by the control/data processing unit 15. The storage unit 16 includes, for example, a ROM (Read Only Memory), RAM (Random Access Memory), and nonvolatile memory such as a flash memory. The ROM stores control data such as programs used by the control/data processing unit 15 and operation parameters. The RAM temporarily stores data such programs executed by the control/data processing unit 15, operation results, and execution status. The nonvolatile memory stores data on various services using non-contact communication.

The reader writer 1 includes an interface (not shown) to connect to an external apparatus such as the higher-level control apparatus 3. The interface is, for example, UART (Universal Asynchronous Receiver Transmitter) or a network terminal.

Next, the configuration of the non-contact IC card 2 will be described continuously with reference to FIG. 2. As shown in FIG. 2, the non-contact IC card 2 roughly includes the antenna 21 and the IC chip 22.

The antenna 21 is configured by a loop antenna to transmit/receive an RF signal and includes a coil L1 (inductor) having a predetermined inductance and a capacitor C1 having a predetermined capacitance. Thus, the antenna 21 in the example of FIG. 2 is configured by a resonance circuit including the coil L1 and the capacitor C1, but may further include the resistor R. The antenna 21 causes an induced voltage by electromagnetic induction in accordance with reception of a carrier and outputs a received voltage obtained by resonating the induced voltage at a predetermined resonance frequency. The resonance frequency in the antenna 21 is set in accordance with the frequency of the carrier, for example, 13.56 MHz. The antenna 21 configured as described above receives a carrier from the reader writer 1. The antenna 21 also transmits a response signal to the reader writer 1 by load modulation by a load modulation unit 29 of the IC chip 22. The reader writer 1 detects changes in impedance of the antenna 21 caused by the load modulation as a response signal from the non-contact IC card 2.

Next, each unit of the IC chip 22 of the non-contact IC card 2 will be described. The IC chip 22 includes a carrier detection unit 23, a rectifying unit 24, a regulator 25, a demodulation unit 26, a data processing unit 27, a storage unit 28, and a load modulating unit 29. Though not shown in FIG. 2, the IC chip 22 may further include, for example, a protection circuit (not shown) to prevent an overvoltage or overcurrent from being applied to the data processing unit 27. For example, a clamp circuit configured by a diode or the like can be used as the protection circuit.

The carrier detection unit 23 generates, for example, a rectangular detection signal based on a received voltage communicated from the antenna 21 and communicates the detection signal to the data processing unit 27. The data processing unit uses the detection signal as a processing clock for data processing. The detection signal is based on a received voltage communicated from the antenna 21 and thus synchronized with the frequency of carriers transmitted from the reader writer 1. Thus, the non-contact IC card 2 can synchronize various kinds of processing with the reader writer 1 by including the carrier detection unit 23.

The rectifying unit 24 is configured by, for example, a diode D1 connected to the coil L1 in series and a capacitor C2 connected to the coil L1 in parallel. The rectifying unit 24 rectifies the received voltage of a carrier received by the antenna 21. The regulator 25 smoothes the received voltage rectified by the rectifying unit 24 and makes the voltage constant before outputting the voltage to the data processing unit 27 as a driving voltage. Thus, the regulator 25 generates a driving voltage of the data processing unit 27 from a DC component of the received voltage.

The demodulation unit 26 demodulates a carrier signal transmitted from then reader writer 1 based on the received voltage rectified by the rectifying unit 24 and outputs transmission data (for example, a binarized data signal of a high level and low level) contained in the carrier signal. Thus, the demodulation unit 26 obtains transmission data contained in a carrier transmitted from the reader writer 1 from an AC component of the received voltage.

The data processing unit 27 is configured by, for example, a processor such as an MPU. The data processing unit 27 is driven by a driving voltage output from the regulator 25 as a power supply to process data demodulated by the demodulation unit 26. To transmit a response signal (return data) to the reader writer 1 in accordance with the a processing result, the data processing unit 27 generates a control signal to control load modulation by the load modulation unit 29 and outputs the control signal to the load modulation unit 29.

The storage unit 28 stores various kinds of data such as programs to operate the data processing unit 27, data acquired from the reader writer 1, and data operated by the data processing unit 27. The storage unit 28 includes, for example, a ROM, RAM, and nonvolatile memory. The ROM stores control data such as programs used by the data processing unit 27 and operation parameters. The RAM temporarily stores data such as programs executed by the data processing unit 27, operation results, and execution status. The nonvolatile memory stores data on various services using non-contact communication. As the nonvolatile memory, for example, a flash memory, EEPROM (Electrically Erasable and Programmable Read Only Memory), MRAM (Magnetoresistive Random Access Memory), FeRAM (Ferroelectric Random Access Memory), or PRAM (Phase change Random Access Memory) is used.

The load modulation unit 29 performs load modulation to change the load (impedance) of the antenna 21 in accordance with a response signal from the non-contact IC card 2 to the reader writer 1. The load modulation is a modulation method by which the non-contact IC card 2 selectively changes the impedance (load) of the antenna 21 so that the non-contact IC card 2 transmits a response signal representing return data to the reader writer 1.

More specifically, the load modulation unit 29 includes, for example, a load Z and a switch SW1 connected in parallel with the resonance circuit of the antenna 21. The load Z is configured by, for example, a resistor having a predetermined resistance value. The switch SW1 is configured by, for example, a p-channel type MOSFET (Metal-Oxide-Semiconductor Field-Effect Transistor) or n-channel type MOSFET. The load modulation unit 29 turns on/off the load Z by using the switch SW1 based on a control signal from the data processing unit 27. A current flowing through the coil L1 of the antenna 21 is thereby changed so that a demagnetizing field is generated by electromagnetic induction from the antenna 21. A response signal (return data) is transmitted from the non-contact IC card 2 to the reader writer 1 by such a demagnetizing field. The reader writer 1 receives a response signal transmitted from the non-contact IC card 2 by detecting changes in voltage generated at an antenna edge of the antenna 11 caused by the influence of the demagnetizing field.

In a communication system according to the present embodiment, as described above, non-contact communication is performed between the reader writer 1 and the non-contact IC card 2 by a carrier being transmitted by the reader writer 1 and load modulation being performed by the non-contact IC card 2. Communication efficiency between the reader writer 1 and the non-contact IC card 2 varies depending on, for example, the coupling coefficient K (d) between the coil L3 constituting the antenna 11 of the reader writer 1 and the coil L1 constituting the antenna 21 of the non-contact IC card 2. More concretely, the communication efficiency is proportional to, for example, the coupling coefficient K (d). d denotes the distance between the coil L3 and the coil L1 and the coupling coefficient K (d) is inversely proportional to the distance d and proportional to the permeability $\mu x$.

3. CONFIGURATION OF SIGNAL PROCESSING APPARATUS

Next, the configuration of the signal processing apparatus 10 according to the present embodiment will be described. For convenience of the description, the configuration thereof will be described in the order of the antenna configuration of the signal processing apparatus 10, power supply configuration, and configuration concerning the communication function.

[3.1. Antenna Configuration of Signal Processing Apparatus]

Figure 3:
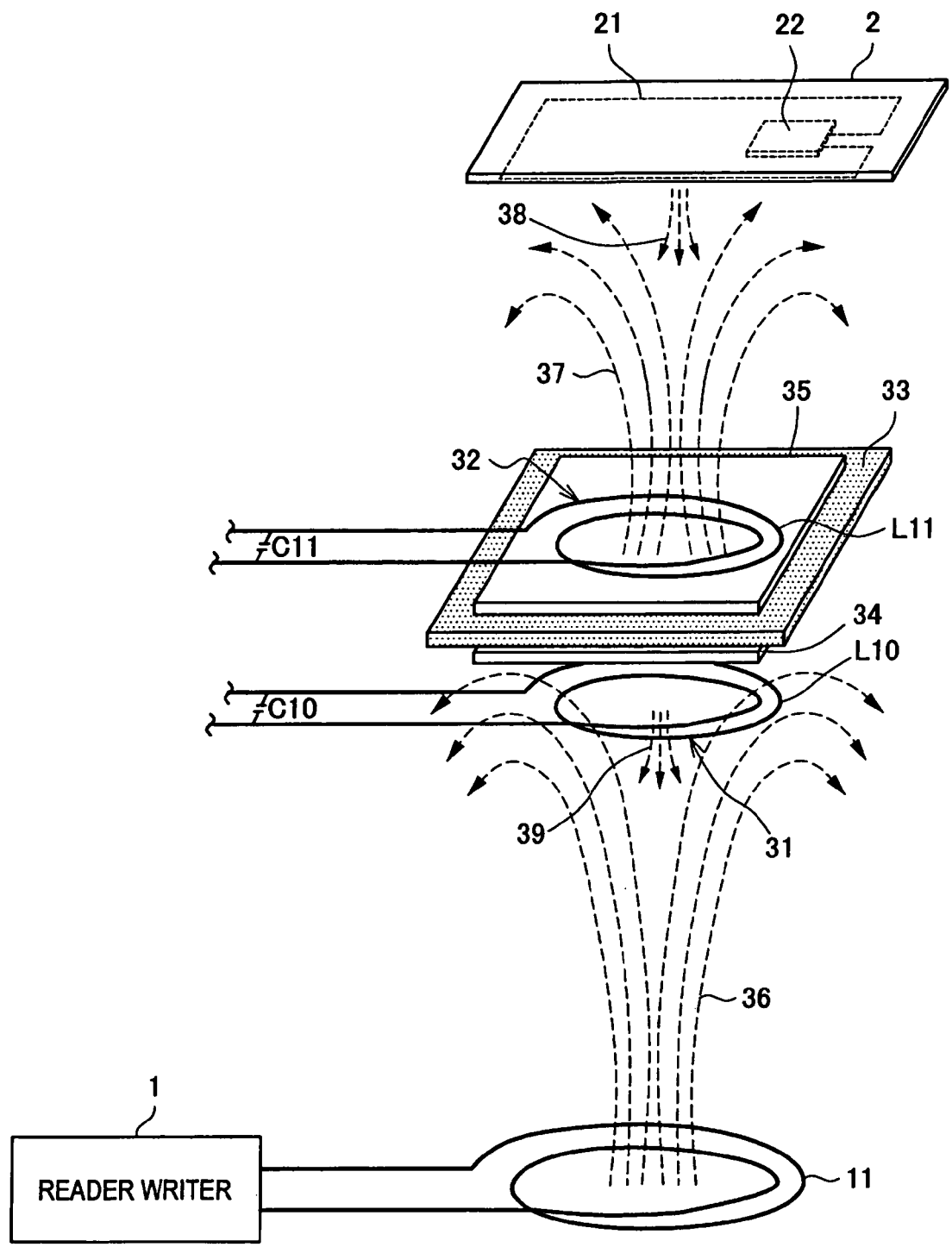
FIG. 3 is a perspective view showing an antenna configuration of a signal processing apparatus according to the embodiment.

First, the antenna configuration of the signal processing apparatus 10 according to the present embodiment will be described with reference to FIG. 3. FIG. 3 is a perspective view showing the antenna configuration of the signal processing apparatus 10 according to the present embodiment.

As shown in FIG. 3, the signal processing apparatus 10 according to the present embodiment includes two antennas 31 and 32 and can independently perform non-contact communication with each of the reader writer 1 and the non-contact IC card 2. The antenna 31 (first antenna) is an antenna to perform non-contact communication with the reader writer 1 and is arranged opposite to the antenna 11 of the reader writer 1 on the reader writer 1 side of the signal processing apparatus 10. On the other hand, the antenna 32 (second antenna) is an antenna to perform non-contact communication with the non-contact IC card 2 and is arranged opposite to the antenna 21 of the non-contact IC card 2 held over the reader writer 1 on the opposite side of the reader writer 1 of the signal processing apparatus 10 (that is, on the side on which the non-contact IC card 2 is held).

The antennas 31 and 32 are each configured by a loop antenna to transmit/receive an RF signal. The antenna 31 includes a coil L10 having a predetermined inductance and a capacitor C10 having a predetermined capacitance and the capacitor C10 is connected to an edge of the coil L10 in parallel with the coil L10. Similarly, the antenna 32 includes a coil L11 having a predetermined inductance and a capacitor C11 having a predetermined capacitance and the capacitor C11 is connected to an edge of the coil L11 in parallel with the coil L11.

The antenna 31 and the antenna 32 are installed adjacent to each other on the underside and the upside of the signal processing apparatus 10 and are arranged in such a way that communication surfaces of the two antennas 31 and 32 (that is, loop surfaces where the coils L10 and L11 of the antennas 31 and 32 are wound respectively) are parallel to each other.

The communication surfaces of the antennas 31 and 32 are also parallel to the communication surface of the antenna 11 of the reader writer 1 (loop surface where the coil L3 of the antenna 11 is wound). Further, one metal body 33 and two magnetic bodies 34 and 35 are arranged between the antenna 31 and the antenna 32 to separate the space between the antenna 31 and the antenna 32.

The metal body 33 is, for example, a metallic plate having an area larger than at least loop surfaces of the antennas 31 and 32 and has a function to block a magnetic field between the antenna 31 and the antenna 32. The metal body 33 is made of, for example, a metal, metallic fiber, or material combining a metal and other materials. The metal body 33 is made of metal material and thus has the effect of blocking a magnetic field on both sides of the metal body 33.

With the metal body 33 interposed between the antennas 31 and 32, a magnetic field 36 of the first carrier generated from the antenna 11 of the reader writer 1 and a magnetic field 37 of the second carrier generated from the antenna 31 of the signal processing apparatus 10 can be blocked. That is, the antenna 31 of the two antennas 31 and 32 of the signal processing apparatus 10 is electromagnetically coupled to the antenna 11 of the reader writer 1 by the magnetic field 36 of the first carrier and the antenna 32 is electromagnetically coupled to the antenna 21 of the non-contact IC card 2 by the magnetic field 37 of the second carrier. Since the signal processing apparatus 10 independently performs non-contact communication with the reader writer 1 and the non-contact IC card 2, it is necessary to separate electromagnetic coupling of the two antennas 31 and 32. Thus, by sandwiching the metal body 33 between the two antennas 31 and 32, electromagnetic coupling of the two antennas 31 and 32 can be separated.

Accordingly, the magnetic field 36 of the first carrier generated by the reader writer 1 using the antenna 11 acts only on the antenna 31 on the reader writer 1 side of the signal processing apparatus 10 and does not act on the antenna 32 on the non-contact IC card 2 side or the antenna 21 of the non-contact IC card 2. Thus, the antenna 32 and the antenna 21 are not induced by the magnetic field 36 of the first carrier and therefore, the magnetic field 36 can be preventing from inhibiting communication between the signal processing apparatus 10 and the non-contact IC card 2 using the antenna 32. On the other hand, the magnetic field 37 of the second carrier generated by the signal processing apparatus 10 by using the antenna 32 to perform communication with the non-contact IC card 2 does not act on the antenna 31 on the reader writer 1 side. Thus, the antenna 31 and the antenna 11 are not induced by the magnetic field 37 of the second carrier and therefore, the magnetic field 37 can be prevented from inhibiting communication between the signal processing apparatus 10 and the reader writer 1 using the antenna 31. Consequently, mutual interference of the two magnetic fields 36 and 37 can be prevented by arranging the metal body 33 and therefore, the signal processing apparatus 10 can suitably perform communication with each of the reader writer 1 and non-contact IC card 2 by using the two antennas 31 and 32.

Next, the magnetic bodies 34 and 35 will be described. As described above, mutual electromagnetic coupling of the two antennas 31 and 32 can be separated by the metal body 33 and also the two magnetic fields 36 and 37 can be separated. However, the metal body 33 is present immediately above and immediately below the antennas 31 and 32 respectively and thus, electromagnetic coupling between the antenna 31 and the antenna 11 of the reader writer 1 and electromagnetic coupling between the antenna 32 and the antenna 21 of the non-contact IC card 2 are also attenuated.

Thus, to solve the above issue, as shown in FIG. 3, the two magnetic bodies 34 and 35 are arranged on both sides of the metal body 33, that is, the first magnetic body 34 is arranged between the antenna 31 and the metal body 33 and the second magnetic body 35 between the metal body 33 and the antenna 32. As a result, a structure is built in which the antenna 31, the magnetic body 34, the metal body 33, the magnetic body 35 and the antenna 32 are superimposed/arranged from the reader writer 1 side in this order.

The magnetic bodies 34 and 35 are constituted of, for example, a magnetic material compressed and formed into a sheet shape after being crushed or a magnetic sheet (for example, a soft magnetic ferrite rubber sheet) obtained by mixing powder of a soft magnetic material in a resin layer. The magnetic material is a material in which electric resistance between powders is large and eddy current losses are small and it is preferable to use a soft magnetic material such as soft magnetic ferrite, amorphous alloy, permalloy, silicon steel, and sendust alloy, but the magnetic material is not limited to such examples. The magnetic bodies 34 and 35 may be pasted to both sides of the plate-shaped metal body 33 or arranged apart from the metal body 33 by a predetermined distance.

The magnetic bodies 34 and 35 have the effect of converging magnetic fluxes of the magnetic fields 36 and 37 generated from the coils L3 and L11 of the antennas 21 and 32 respectively and collecting the magnetic fluxes to the vicinities of the antennas 31 and 32. For example, the magnetic body 34 bends a magnetic flux of the magnetic field 36 reaching the antenna 31 from the antenna 11 of the reader writer 1 to cause the magnetic flux to converge to the antenna 31. The magnetic body 35 bends a magnetic flux of a demagnetizing field 38 reaching the antenna 32 from the antenna 21 of the non-contact IC card 2 to cause the magnetic flux to converge to the antenna 32.

Thus, magnetic fluxes of the magnetic fields 36 and 37 are caused to converge to the antennas 31 and 32 by arranging the magnetic bodies 34 and 35 so that attenuation of electromagnetic coupling between the antennas 11 and 31 and electromagnetic coupling between the antennas 21 and 32 caused by the metal body 33 can be reduced. Thus, electromagnetic coupling between the antennas 31 and 32 of the signal processing apparatus 10, the antenna 11 of the reader writer 1, and the antenna 21 of the non-contact IC card 2 can be strengthened and therefore, data can suitably be transmitted/received between the signal processing apparatus 10 and the reader writer 1 and the non-contact IC card 2 by supplying the magnetic fields 36, 37, 38 and 39.

The antenna structure of the signal processing apparatus 10 according to the present embodiment and the structure of a booster antenna in the related art to extend the communication distance will be compared. According to the related art described in Japanese Patent Application Laid-Open Nos. 2005-323019, 2008-306689, and 2000-138621, an auxiliary antenna called a booster antenna is used to increase Q of a resonance circuit or a coupling coefficient. The booster antenna increases Q of a resonance circuit or electromagnetic coupling by coupling the inductance or capacitance of the antennas 11 and 21 of the reader writer 1 and non-contact IC card 2 respectively to the inductance or capacitance of the booster antenna.

Thus, values of inductance, capacitance and the like of a booster antenna in the related art may not be decided based on the booster antenna alone and need to be adjusted according to values of the inductance, capacitance, degree of coupling and the like of the reader writer 1 and the non-contact IC card 2. Therefore, it becomes necessary to install a booster antenna individually designed and adjusted for the existing reader writer 1, posing an issue that the installation thereof is complicated and difficult. Further, the booster antenna in the related art extends the communication distance of the reader writer 1 by using the resonance or electromagnetic coupling phenomenon of antenna coils of the reader writer 1 and the non-contact IC card 2 and thus, the effect of extending the communication distance is not high. There is also an issue that almost no effect of extending the communication distance is produced even if the booster antenna in the related art is installed for the reader writer 1 or the non-contact IC card 2 for which the resonance circuit is maximally adjusted.

By contrast, the signal processing apparatus 10 according to the present embodiment is structured to have the independent antennas 31 and 32 for the reader writer 1 and the non-contact IC card 2 respectively. Thus, when the antennas 31 and 32 are designed, the inductance and capacitance of the antennas 11 and 21 of the reader writer 1 and the non-contact IC card 2 do not have to be known. Accordingly, like the design of the antenna 21 of the non-contact IC card 2, the antenna 31 for communication with the reader writer 1 can be designed as an independent antenna. Also, like the design of the antenna 11 of the reader writer 1, the antenna 32 for communication with the non-contact IC card 2 can be designed as an independent antenna.

In this case, regarding the antenna 32 facing the non-contact IC card 2, because a strong electromagnetic field of a predetermined carrier frequency is generated from the antenna 31, the resonance frequency of the antenna 32 is designed in accordance with the carrier frequency. Depending on the type of the non-contact IC card 2 to be communicated, the resonance frequency of the antenna 32 may be shifted from the carrier frequency. Regarding the antenna 31 facing the reader writer 1, on the other hand, because the signal processing apparatus 10 may be brought closer to the reader writer 1 or arranged apart from the reader writer 1, the resonance frequency of the antenna 31 is adjusted so that carrier's magnetic field intensity and power and carrier modulation waveforms are optimized in accordance with each installation situation. Adjustments of the resonance frequency can easily be made by using a variable capacitance capacitor.

In light of the antenna structure of the signal processing apparatus 10 according to the present embodiment described above, the installation of the signal processing apparatus 10 can be made easy. Moreover, in the signal processing apparatus 10 according to the present embodiment, communication between the reader writer 1 and the non-contact IC card 2 can be used by using the two antennas 31 and 32 that do not interfere with each other and having independent characteristics and thus, more effect of extending the communication distance of the reader writer 1 can advantageously be produced.

[3.2. Power Supply Configuration of Signal Processing Apparatus]

Figure 4:
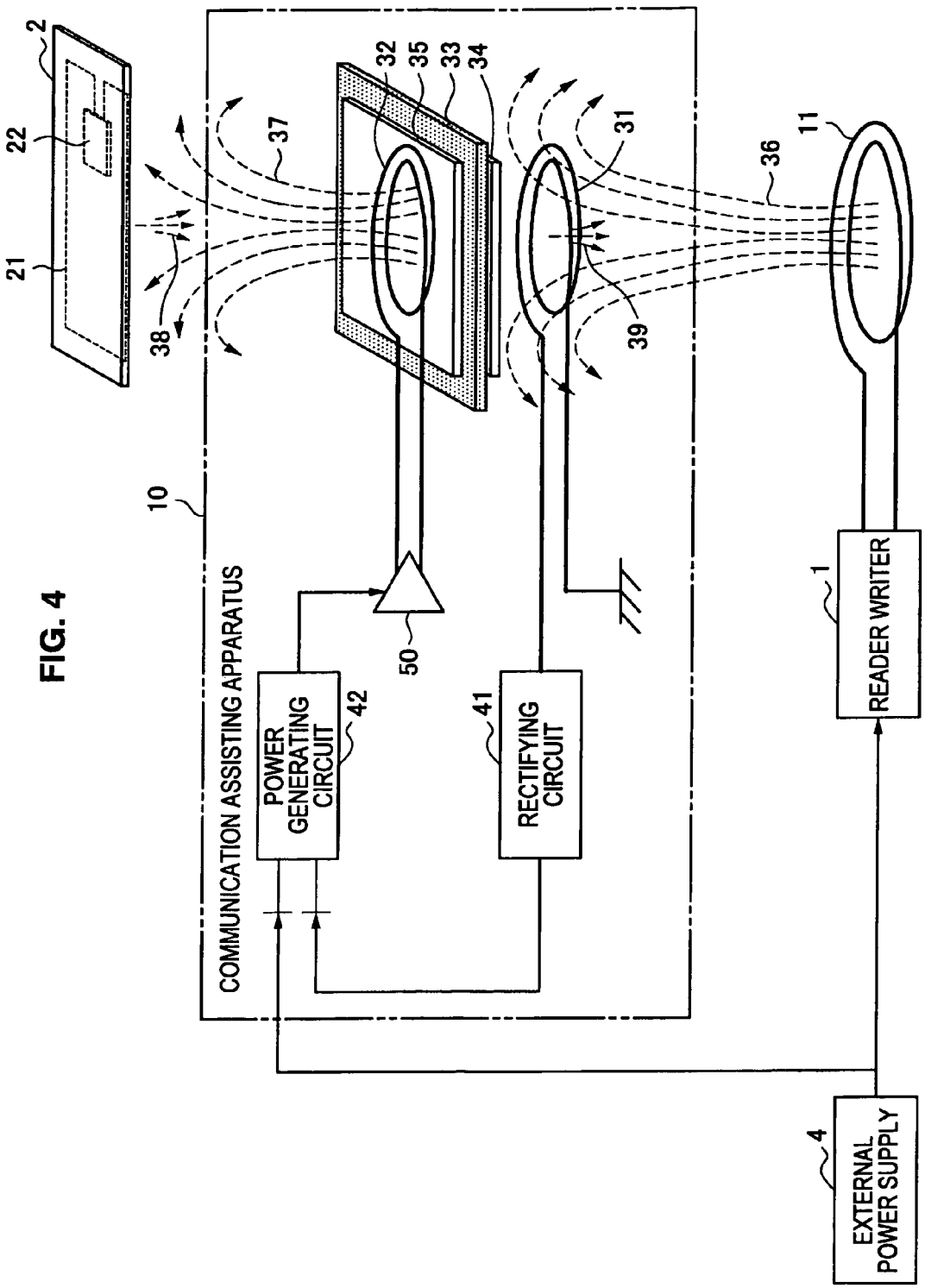
FIG. 4 is a block diagram showing a power supply configuration of the signal processing apparatus according to the embodiment.

Next, the power supply configuration of the signal processing apparatus 10 according to the present embodiment will be described with reference to FIG. 4. FIG. 4 is a block diagram showing the power supply configuration of the signal processing apparatus 10 according to the present embodiment.

As shown in FIG. 4, the signal processing apparatus 10 adopts the configuration in which power is supplied within the apparatus and includes a rectifying circuit 41 and a power generating circuit 42. The rectifying circuit 41 is an example of the rectifying unit according to the embodiment of the present invention and has the function to generate internal power by rectifying a signal of the first carrier received by the antenna 31. The rectifying circuit 41 is connected to the antenna 31 to perform communication with the reader writer 1. The power generating circuit 42 is connected to the rectifying circuit 41 and the external power supply 4 to supply power to each unit of the signal processing apparatus 10 including the amplifier circuit 50 for carrier transmission.

The rectifying circuit 41 has the function to rectify the received voltage of the first carrier received by the antenna 31. Like the rectifying unit 24 shown, for example, in FIG. 2, the rectifying circuit 41 is configured by, for example, a diode (not shown) connected to the coil L10 of the antenna 31 in series and a capacitor (not shown) connected to the coil L10 in parallel. When, as described above, the antenna 31 receives the magnetic field 36 of the first carrier generated from the antenna 11 of the reader writer 1, the rectifying circuit 41 rectifies a received voltage induced in the antenna 31. The received voltage rectified by the rectifying circuit 41 is smoothed and made constant by a smoothing circuit (not shown) (for example, a regulator) before being output to the power generating circuit 42. In this manner, a driving voltage (internal power) used inside the signal processing apparatus 10 is generated by using the magnetic field 36 from the reader writer 1.

The power generating circuit 42 generates power used inside the signal processing apparatus 10 by mixing internal power generated by using the magnetic field 36 from the reader writer 1 and external power supplied from the external power supply 4. The power generating circuit 42 also outputs the generated power to the amplifier circuit 50 for carrier transmission and other circuits. Each unit of the signal processing apparatus 10 is driven by using power output from the power generating circuit 42 as a power supply. For example, the amplifier circuit 50 amplifies the first carrier by using external power supplied from the external power supply 4 and internal power obtained from the first carrier (magnetic field 36) received by the antenna 31.

The mixing ratio of internal power and external power by the power generating circuit 42 is, for example, 1:3 to 20 and if external power is larger than internal power, the amplifier circuit 50 can sufficiently amplify the carrier by using large external power. However, the mixing ratio of internal power and external power is not limited to the above example and may be any ratio.

As described above, the signal processing apparatus 10 according to the present embodiment reuses power converted from the magnetic field 36 of the first carrier generated by the reader writer 1 as a power supply and also uses external power supplied from the external power supply 4. By reusing internal power obtained from the magnetic field 36 of the reader writer 1, energy can be used effectively and efficient power can be obtained. Further, the amplifier circuit 50 can greatly extend the communication distance by using large external power from the external power supply 4 to sufficiently amplify the magnetic field 37 of the second carrier transmitted from the antenna 32 to the non-contact IC card 2. However, the present embodiment is not limited to the above example and only external power from the external power supply 4 may be used as driving power of the signal processing apparatus 10 without using internal power by generating the internal power from the magnetic field 36 of the reader writer 1.

[3.3. Configuration of Communication Function of Signal Processing Apparatus]

Figure 5:
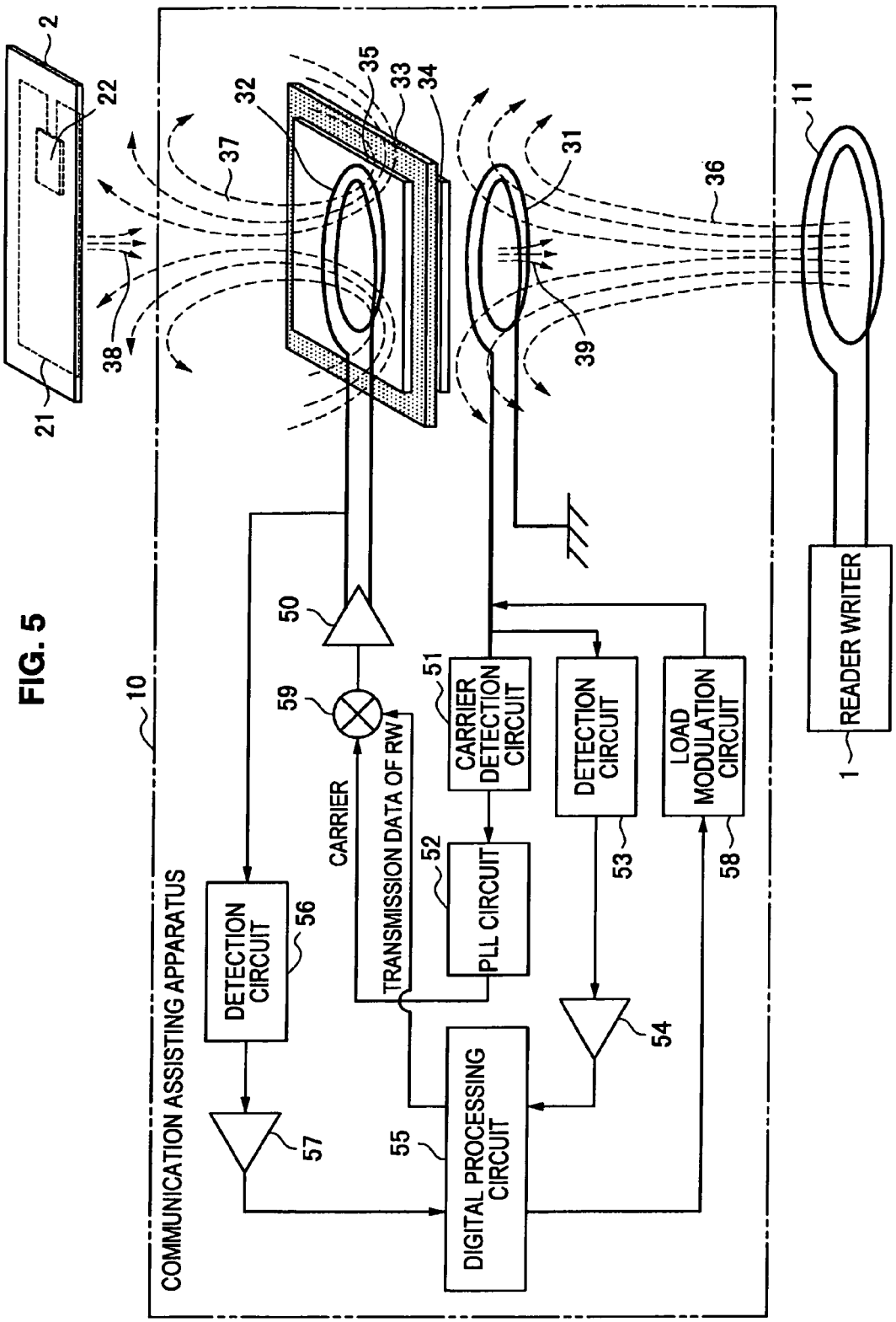
FIG. 5 is a block diagram showing the configuration concerning a communication function of the signal processing apparatus according to the embodiment.

Next, the configuration concerning the communication function of the signal processing apparatus 10 according to the present embodiment will be described with reference to FIG. 5. FIG. 5 is a block diagram showing the configuration concerning the communication function of the signal processing apparatus 10 according to the present embodiment.

As shown in FIG. 5, the signal processing apparatus 10 includes the antennas 31 and 32, the amplifier circuit 50 for carrier transmission (carrier amplifier), a carrier detection circuit 51, a PLL circuit 52, a detection circuit 53 for transmission data, an amplifier circuit 54 for transmission data, a digital processing circuit 55, a detection circuit 56 for return data, an amplifier circuit 57 for return data, a load modulation circuit 58, and a modulation circuit 59.

The amplifier circuit 50 is an example of the amplifier of the present invention and has the function to amplify a signal of a first carrier (first carrier wave) received by the antenna to generate a second carrier (second carrier wave). The modulation circuit 59 is an example of the modulator according to the embodiment of the present invention and has the function to modulate a signal of a first carrier (first carrier wave) received by the antenna 31 by transmission data (first data) received by the antenna 31. The digital processing circuit 55 is an example of the digital processor according to the embodiment of the present invention and has the function to digitally process transmission data (first data) received from the reader writer 1 by the antenna 31 and return data (second data) received from the non-contact IC card 2 by the antenna 32. The detection circuit 56 for return data is an example of the detector according to the embodiment of the present invention and has the function to detect a signal of return data (second data) generated in the antenna 32 (second antenna) by load modulation of the antenna 21 of the non-contact IC card 2. The amplifier circuit 57 for return data is an example of the reception amplifier according to the embodiment of the present invention and has the function to amplify a signal of return data (second data) detected by the detection circuit 56. The load modulation circuit 58 is an example of the load modulator according to the embodiment of the present invention and has the function to transmit return data (second data) from the antenna 31 to the reader writer 1 by performing load modulation that changes the impedance of the antenna 31 (first antenna).

The carrier detection circuit 51, the detection circuit 53, and the load modulation circuit 58 are connected to an edge of the antenna 31 on the reader writer 1 side. The amplifier circuit 50 and the detection circuit 56 are connected to an edge of the antenna 32 on the non-contact IC card 2 side. The carrier detection circuit 51 is connected to the amplifier circuit 50 via the PLL circuit 52 and the modulation circuit 59 and the digital processing circuit 55 is connected to the amplifier circuit 50 via the modulation circuit 59 and also connected to the load modulation circuit 58. The detection circuit 53 is connected to the digital processing circuit 55 via the amplifier circuit 54 and the detection circuit 56 is connected to the digital processing circuit 55 via the amplifier circuit 57. The communication operation using each unit of the signal processing apparatus 10 will be described below.

First, processing by the signal processing apparatus 10 to amplify a carrier transmitted from the reader writer 1 to the non-contact IC card 2 will be described. The reader writer 1 performs amplitude modulation of a first carrier using data (transmission data) to be transmitted to the non-contact IC card 2 and transmits the first carrier modulated with the transmission data (that is, the high-frequency magnetic field 36) by using the antenna 11. Then, the antenna 31 of the signal processing apparatus 10 receives the first carrier modulated with the transmission data and next, the carrier detection circuit 51 detects a carrier signal of the first carrier received by the antenna 31 based on the received voltage at an edge of the antenna 31. Further, the amplifier circuit 50 of the signal processing apparatus 10 amplifies the detected carrier signal to generate a carrier signal of a second carrier and the antenna 32 to which the carrier signal is applied retransmits the second carrier (that is, the high-frequency magnetic field 37) to the non-contact IC card 2.

If, at this point, the phase of the first carrier from the reader writer 1 received by the antenna 31 and the phase of the second carrier retransmitted to the non-contact IC card 2 from the antenna 32 are shifted, the carriers (the magnetic field 36 and the magnetic field 37) are cancelled out or attenuated. Thus, in the present embodiment, the PLL circuit 52 to synchronize phases of both carriers is installed in a subsequent stage of the carrier detection circuit 51. Phases of the first carrier and the second carrier can thereby be synchronized so that the signal processing apparatus 10 can perform various kinds of processing in synchronization with the reader writer 1 and the non-contact IC card 2.

The signal processing apparatus 10 can also amplify a carrier signal obtained from the first carrier received from the reader writer 1 through the amplifier circuit 50 to retransmit the amplified second carrier to the non-contact IC card 2. As described above, the amplifier circuit 50 is not limited in power for usage of external power from the external power supply 4. Thus, the magnetic field 37 of the second carrier to be retransmitted to the non-contact IC card 2 can be made stronger than the magnetic field 36 of the first carrier of the reader writer 1 by increasing the gain or buffer performance of the amplifier circuit 50. Therefore, the communication distance between the signal processing apparatus 10 and the non-contact IC card 2 can greatly be extended more than the communication distance between the reader writer 1 and the non-contact IC card 2.

Next, processing to transmit transmission data from the reader writer 1 to the non-contact IC card 2 via the signal processing apparatus 10 will be described. The antenna 31 of the signal processing apparatus 10 receives the first carrier (that is, the high-frequency magnetic field 36) modulated with the transmission data from the reader writer 1. Then, the detection circuit 53 demodulates a carrier signal transmitted from the reader writer 1 to extract transmission data (for example, a data signal binarized by a high level and low level) contained in the carrier signal. For example, the detection circuit 53 demodulates the carrier signal by performing envelope detection of changes in amplitude of the received voltage at an antenna edge of the antenna 31 and binarizing the detected signal. The signal of the transmission data detected by the detection circuit 53 is amplified by the amplifier circuit 54 and input into the digital processing circuit 55.

The digital processing circuit 55 is configured by a processor such as an MPU and CPU. The digital processing circuit performs shaping processing of waveforms or filtering processing on the signal of the transmission data and then performs FIFO and buffering processing thereon. The digital processing circuit 55 can also perform change processing of the communication protocol such as changing the communication method or the bit rate for transmission data.

Further, the digital processing circuit 55 verifies that the transmission data is non-contact communication data based on a Sync code, Stat bit/frame or the like contained in the transmission data. This verification can prevent erroneous transmission of non-data such as noise. After the verification is completed, the digital processing circuit 55 outputs the transmission data to the modulation circuit 59 to retransmit the transmission data to the non-contact IC card 2 from the antenna 32. The modulation circuit 59 uses the transmission data input from the digital processing circuit 55 to perform amplitude modulation of a carrier signal of the first carrier and the amplifier circuit 50 amplifies the modulated signal to generate a carrier signal of the second carrier and to output the carrier signal to the antenna 32. As a result, the antenna 32 transmits the second carrier (high-frequency magnetic field 37) modulated with the transmission data to the non-contact IC card 2. Incidentally, as illustrated in FIG. 5, after a signal of the first carrier is modulated by the modulation circuit 59 with transmission data, the modulated signal may be amplified by the amplifier circuit 50 to generate a signal of the second carrier. Alternatively, in contrast, a signal of the first carrier is amplified by the amplifier circuit 50, after which the amplified signal may be modulated by the modulation circuit 59 with transmission data to generate a signal of the second carrier.

Next, processing to return return data to the reader writer 1 from the non-contact IC card 2 via the signal processing apparatus 10 will be described. When the second carrier modulated with transmission data is received from the signal processing apparatus 10, the non-contact IC card 2 performs predetermined corresponding processing on the transmission data to generate return data to the reader writer 1 and returns the return data from the antenna 21 by the above load modulation. That is, the non-contact IC card 2 generates the demagnetizing field 38 corresponding to the transmission data from the antenna 21 by changing the impedance (load) of the antenna 21.

Then, the antenna 32 of the signal processing apparatus 10 receives return data retuned from the non-contact IC card 2 and the detection circuit 56 detects the return data based on changes in voltage an at antenna edge of the antenna 32. When the demagnetizing field 38 generated from the antenna 21 of the non-contact IC card 2 by the load modulation passes through the antenna 32 of the signal processing apparatus 10, a feeble current is induced in the antenna 32 and superimposed on a current flowing through the antenna 32 caused by a second carrier signal. Thus, the detection circuit 56 can detect return data from the non-contact IC card 2 by detecting feeble changes in current flowing through the antenna 32. For example, the detection circuit 56 performs envelope detection of changes in amplitude of the voltage at an antenna edge of the antenna 32 and binarizes the detected signal to obtain a feeble signal of the return data. The feeble signal of the return data is amplified by the amplifier circuit 57 and input into the digital processing circuit 55.

The digital processing circuit 55 performs shaping processing of waveforms or filtering processing on the signal of the return data and then performs FIFO and buffering processing thereon. Like the above transmission data, the digital processing circuit 55 can also perform change processing of the communication protocol such as changing the communication method or the bit rate for return data.

Then, the digital processing circuit 55 verifies that the return data is non-contact communication data based on the Sync code, Stat bit/frame or the like contained in the return data. This verification can prevent erroneous transmission of non-data such as noise. After the verification is completed, the digital processing circuit 55 outputs the return data to the load modulation circuit 58 to retransmit the return data to the reader writer 1 from the antenna 31.

The load modulation circuit 58 performs load modulation to change the load (impedance) of the antenna 31 in accordance with a signal of return data from the non-contact IC card 2 to the reader writer 1 to transmit the return data to the reader writer 1 from the antenna 31. The load modulation circuit 58 includes, like the load modulation unit 29 shown, for example, in FIG. 2, a load and a switch connected in parallel with the resonance circuit of the antenna 31. The load modulation circuit 58 turns on/off the load by using the switch based on a signal of return data input from the digital processing circuit 55. The current flowing through the coil L10 of the antenna 21 is thereby changed so that the demagnetizing field 39 corresponding to the signal of the return data is generated from the antenna 31 due to electromagnetic induction. By the demagnetizing field 39, the return data is transmitted from the antenna 31 of the signal processing apparatus 10 to the antenna 11 of the reader writer 1. The reader writer 1 receives a signal of the return data transmitted from the signal processing apparatus 10 by detecting changes of the received voltage generated at an antenna edge of the antenna 11 under the influence of the demagnetizing field 39.

In the foregoing, the circuit configuration concerning the communication function of the signal processing apparatus 10 according to the present embodiment has been described with reference to FIG. 5. By arranging the signal processing apparatus 10 configured as described above between the reader writer 1 and the non-contact IC card 2, the signal processing apparatus 10 can repeat the function of the reader writer 1 and the function of the non-contact IC card 2. That is, transmission data transmitted by the reader writer 1 can be retransmitted to the non-contact IC card 2 and also return data returned by the non-contact IC card 2 can be retransmitted to the reader writer 1. Thus, the signal processing apparatus 10 can relay non-contact communication between the reader writer 1 and the non-contact IC card 2 and further, extend the communication distance between the reader writer 1 and the non-contact IC card 2 greatly. The configuration of the signal processing apparatus 10 shown in FIG. 5 is only an example and each circuit, block, or system can be optimized or the design thereof can be changed if necessary.

[3.4. Changes of Communication Specifications of Reader Writer by Signal Processing Apparatus]

Next, a method of changing RF communication specifications (such as communication performance and the communication method) of the reader writer 1 by the signal processing apparatus 10 according to the present embodiment will be described with reference to FIG. 5.

As shown in FIG. 5, by arranging the signal processing apparatus 10 according to the present embodiment between the reader writer 1 and the non-contact IC card 2 and freely changing performance of each unit of the signal processing apparatus 10, RF communication specifications of the reader writer 1 with respect to the non-contact IC card 2 can be changed. The RF communication specifications are a concept including the communication performance and the communication method. Concrete examples of changing the communication performance or the communication method of the reader writer 1 from the signal processing apparatus 10 will be described below.

(1) Changing the Magnetic Field Intensity of a Carrier

The communication distance between the reader writer 1 and the non-contact IC card 2 can be extended by increasing the output (gain) of the amplifier circuit 50 of the signal processing apparatus 10 to increase the magnetic field intensity of the carrier (magnetic field 37) transmitted to the non-contact IC card 2. The amplifier circuit 50 generates, as described above, a second carrier to be transmitted to the non-contact IC card 2 by amplifying a signal of the first carrier received from the reader writer 1. At this point, the amplifier circuit 50 can amplify the carrier signal by using not only internal power obtained from the magnetic field 36 generated by the reader writer 1, but also external power from the external power supply 4. Therefore, the magnetic field intensity of the second carrier (magnetic field 37) can be made sufficiently strong by increasing the gain of the amplifier circuit 50 so that the communication distance between the reader writer 1 and the non-contact IC card 2 can greatly be extended.

Moreover, the inductance and coupling between the antenna 11 of the reader writer 1 and the antenna 32 of the signal processing apparatus 10 and the magnetic field 36 are configured to be separable and thus, values of the resonance circuits of the coil L11 and the capacitor C11 of the antenna 32 can be changed to optimum values to be able to extend the communication distance.

For example, even if the communication distance of the reader writer 1 alone is 50 mm due to low communication performance of the existing reader writer 1, the communication distance from the reader writer 1 to the non-contact IC card 2 can be extended by 100 mm by using the signal processing apparatus 10. Thus, the communication distance from the existing reader writer 1 to the non-contact IC card 2 can sufficiently be extended only by installing the signal processing apparatus 10 without modifying or replacing the existing reader writer 1.

(2) Changing Communication Performance of Return Data from the Non-Contact IC Card 2

By changing performance of the detection circuit 56 and the amplifier circuit 57 for receiving return data in the signal processing apparatus 10, receiving performance (for example, the receiving sensitivity, receiving method, and detection method) of return data transmitted by load modulation from the non-contact IC card 2 can be changed. More specifically, the detection circuit 56, the amplifier circuit 57 and the like of the signal processing apparatus 10 constitute the receiving circuit of the signal processing apparatus 10 and performance (for example, OP amplifier performance and the AD converter receiving method) of an analog circuit of a receiving circuit of the signal processing apparatus 10 and the detection method (for example, the amplitude detection and orthogonal detection) of the receiving circuit can be changed to receiving performance that is different from the receiving performance of a receiving circuit of the reader writer 1. By adjusting receiving performance of the receiving circuit of the signal processing apparatus 10 so as to be superior to performance of the receiving circuit of the reader writer 1, it becomes possible to extend the communication distance or to upgrade a communication disabled area.

For example, the receiving sensitivity (for example, the gain of the amplifier circuit 57) of the detection circuit 56 and the amplifier circuit 57 when return data is received from the non-contact IC card 2 is adjusted so as to be higher than the receiving sensitivity of the return data by the demodulation unit of the reader writer 1. Accordingly, the receiving sensitivity of return data from the non-contact IC card 2 can be improved. For example, even if the receiving sensitivity of the reader writer 1 alone is 30 dB due to low receiving performance of the existing reader writer 1, the receiving sensitivity of return data from the non-contact IC card 2 can be improved to 60 dB by using the signal processing apparatus 10. Thus, the receiving sensitivity of return data from the non-contact IC card to the existing reader writer 1 can be improved only by installing the signal processing apparatus 10 without modifying or replacing the existing reader writer 1.

(3) Changing the Degree of Modulation of Transmission Data

The modulation circuit 59 of the signal processing apparatus 10 functions as a data modulation amplifier that modulates a second carrier transmitted to the non-contact IC card 2 with transmission data to be transmitted from the reader writer to the non-contact IC card 2. By changing the degree of modulation when the second carrier is modulated by the modulation circuit 59 with transmission data, the degree of modulation of the second carrier by the signal processing apparatus 10 can be changed with respect to the degree of modulation of the first carrier of the existing reader writer 1. For example, if the degree of modulation of the first carrier emitted from the reader writer 1 should be changed in accordance with a user who uses a communication system, the environment in which the communication system is used, or specifications thereof, the degree of modulation of the second carrier transmitted from the signal processing apparatus 10 to the non-contact IC card 2 may be changed.

For example, the degree of modulation of the second carrier transmitted by the signal processing apparatus 10 may be adjusted to any degree of modulation in accordance with characteristics (for example, the type of the non-contact IC card 2, communication performance, or specifications of the demodulation unit 26) of the non-contact IC card 2 to which the second carrier is transmitted. Accordingly, even if the modulation unit of the existing reader writer 1 supports only a low degree of modulation (10%), the second carrier modulated with a high degree of modulation (30%) can be transmitted to the non-contact IC card 2 supporting the high degree of modulation by using the signal processing apparatus 10. Thus, the degree of modulation of the carrier transmitted to the non-contact IC card can freely be changed in accordance with, for example, the user, the environment in which the communication system is used, or specifications thereof (for example, characteristics of the non-contact IC card 2) only by installing the signal processing apparatus 10 without modifying or replacing the existing reader writer 1.

(4) Changing the Communication Method

The signal processing apparatus 10 is configured to retransmit data transmitted/received between the reader writer 1 and the non-contact IC card 2 and thus, the communication method between the reader writer 1 and the non-contact IC card 2 can be changed by the signal processing apparatus 10. For example, the digital processing circuit 55 of the signal processing apparatus 10 digitally processes transmission data from the reader writer 1 and return data from the non-contact IC card 2 and can change the communication method between the reader writer 1 and the non-contact IC card 2 by changing the data structure of the transmission data and return data or the communication bit rate. The digital processing circuit 55 changes the data structure of transmission data received from the reader wrier 1 to the data structure of a communication method supported by the non-contact IC card 2 and the data structure of return data received from the non-contact IC card 2 to the data structure of the communication method supported by the reader writer 1.

Changing the data structure includes changing the encoding method of data and the packetization method. If, for example, the communication method is changed from FeliCa (registered trademark) to TypeA, the digital processing circuit first decodes and demodulates data encoded (for example, Manchester encoding) and packetized (for example, preamble, Sync code, 8-bit MSB, and CRC) by the FeliCa (registered trademark) method to digital data and buffers the digital data. Next, the digital processing circuit 55 encodes (for example, Modified Mirror encoding) and packetizes (for example, SOC, EOC header, parity, and CRC) the digital data by the TypeA method to change the communication method. The above digital data conversion processing is performed by the digital processing circuit 55 such as a logic circuit and CPU.

For example, even if the existing reader writer 1 supports only a communication method of a specific standard (for example, FeliCa (registered trademark)), the digital processing circuit 55 of the signal processing apparatus 10 converts transmission data of the specific standard received from the reader writer 1 to data of the communication method of another standard (for example, TypeA or TypeB). Accordingly, the signal processing apparatus 10 can transmit the converted transmission data to the non-contact IC card 2 supporting the communication method of the other standard. The digital processing circuit 55 also converts return data of the other standard (for example, TypeA or TypeB) received from the non-contact IC card 2 to data of the communication method of the specific standard (for example, FeliCa (registered trademark)). Accordingly, the signal processing apparatus 10 can transmit the converted return data to the reader writer 1 supporting only the communication method of the specific standard. Thus, data can be transmitted/received between the reader writer 1 and the non-contact IC card 2 supporting different respective communication methods only by installing the signal processing apparatus 10 without modifying or replacing the existing reader writer 1. Therefore, it is preferable that the digital processing circuit 55 of the signal processing apparatus 10 support various communication methods (for example, the communication standard and bit rate).

4. SIGNAL PROCESSING METHOD

Next, the signal processing method that assists non-contact communication between the reader writer 1 and the non-contact IC card 2 by the signal processing apparatus 10 according to the present embodiment will be described with reference to FIG. 6. FIG. 6B is a flowchart showing the signal processing method by the signal processing apparatus 10 according to the present embodiment.

Figure 6A:
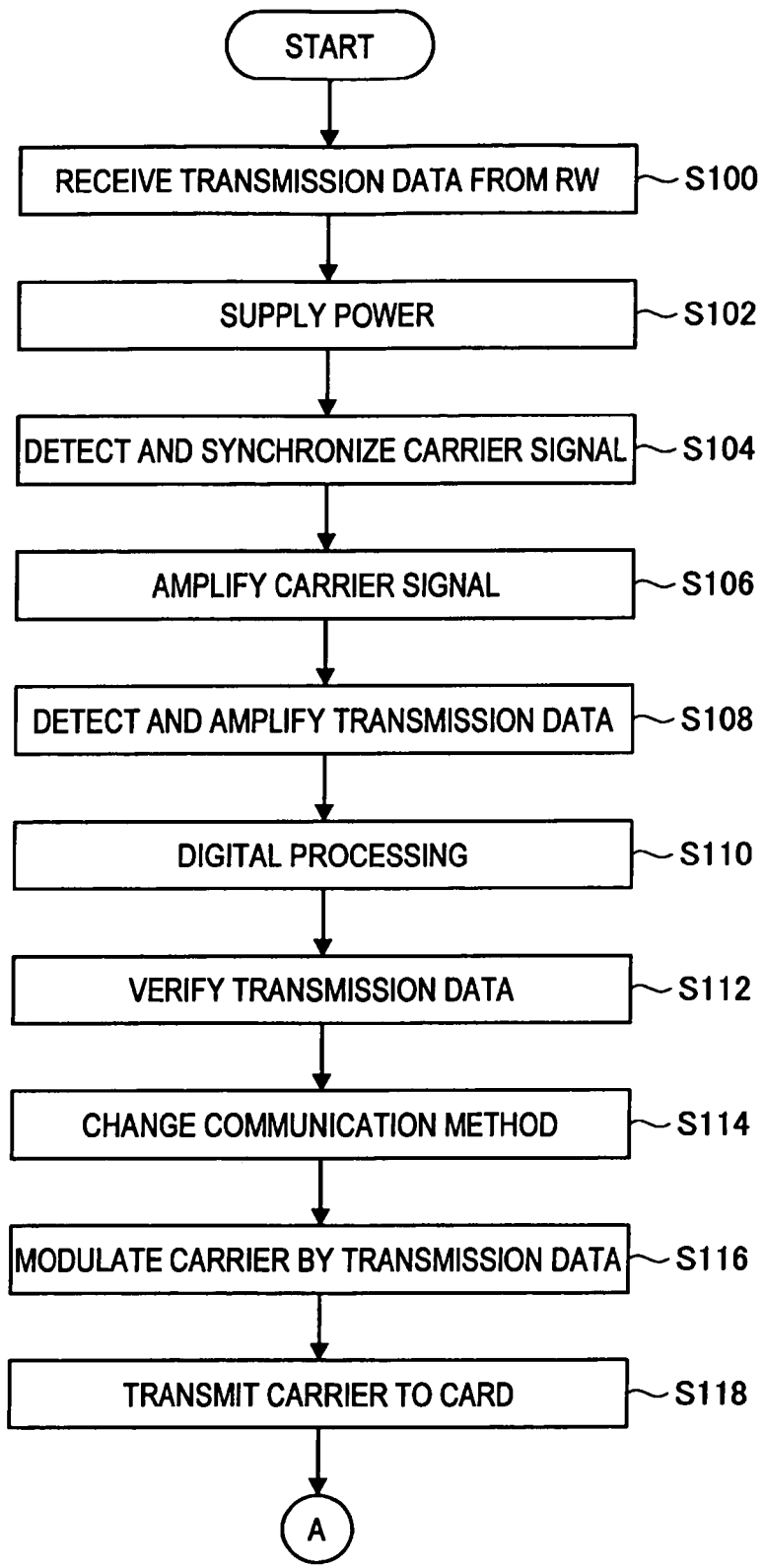
FIG. 6A is a flowchart showing a signal processing method by the signal processing apparatus according to the embodiment.

As shown in FIG. 6, when the reader writer 1 transmits a first carrier modulated with transmission data to the non-contact IC card 2 by using the antenna 11, the signal processing apparatus 10 receives the first carrier modulated with the transmission data from the reader writer 1 by using the antenna 31 (S100). In this case, the metal body 33 is arranged between the antenna 31 and the antenna 32 of the signal processing apparatus 10 and thus, the antenna 31 is not affected by the magnetic field 37 emitted by the antenna 32. Moreover, the magnetic body 34 is arranged between the antenna 31 and the metal body 33 and thus, the magnetic field 36 of the first carrier from the reader writer 1 converges to the antenna 31. Therefore, the signal processing apparatus 10 can suitably receive the magnetic field 36 of the first carrier from the reader writer 1 by using the antenna 31.

Next, the rectifying circuit 41 of the signal processing apparatus 10 rectifies and smoothes the received voltage of the first carrier received from the reader writer 1 to generate internal power reusing the magnetic field 36 from the reader writer 1. The power generating circuit 42 supplies power obtained by mixing the internal power and external power from the external power supply 4 to each unit of the signal processing apparatus 10 (S102). The power supply continues also in steps below.

Further, the carrier detection circuit 51 of the signal processing apparatus 10 detects a carrier signal of the first carrier received by the antenna 31 based on the received voltage at an edge of the antenna 31 and the PLL circuit 52 synchronizes the carrier signal of the first carrier and a carrier signal of the second carrier amplified by the amplifier circuit 50 in a subsequent stage (S104). Further, the amplifier circuit 50 amplifies the carrier signal of the first carrier detected by the carrier detection circuit 51 by using power supplied from the power generating circuit 42 to generate the carrier signal of the second carrier with a larger amplitude (S106). The processing in steps S104 and S106 continues also in steps below.

When the first carrier modulated using the transmission data is received by the antenna 31, the detection circuit 53 detects transmission data contained in the carrier signal of the first carrier based on the received voltage at the antenna edge of the antenna 31 and the amplifier circuit 54 amplifies the detected transmission data (S108).

Next, the digital processing circuit 55 performs predetermined digital processing (such as waveform shaping, filtering processing, FIFO and buffering processing) on a signal of the amplified transmission data (S110). Further, the digital processing circuit 55 verifies that the transmission data is non-contact communication data based on the Sync code, Stat bit/frame or the like contained in the transmission data (S112) and if the verification is completed, the processing proceeds to steps S114 and S116 below. This verification can prevent erroneous transmission of non-data such as noise.

If the communication method is different between the reader writer 1 and the non-contact IC card 2, the digital processing circuit 55 changes the data structure of transmission data according to the communication method of the non-contact IC card 2, which is the transmission destination, if necessary (S114). Accordingly, the communication method of transmission data can be changed from the communication method (for example, FeliCa (registered trademark)) supported by the reader writer 1, which is the transmission source, to the communication method (for example, TypeA) supported by the non-contact IC card 2, which is the transmission destination.

The modulation circuit 59 of the signal processing apparatus 10 performs amplitude modulation of the carrier signal of the second carrier generated in S106 by using the transmission data digitally processed in S110 and outputs the modulated carrier signal to the antenna 32 (S116). As a result, the antenna 32 transmits the second carrier (high-frequency magnetic field 37) modulated with the transmission data to the non-contact IC card 2 (S118). In this case, the metal body 33 is arranged between the antenna 31 and the antenna 32 of the signal processing apparatus 10 and thus, the antenna 32 is not affected by the magnetic field 36 emitted by the reader writer 1. Moreover, the magnetic body 35 is arranged between the antenna 32 and the metal body 33 and thus, the magnetic field 37 of the second carrier from the antenna 32 converges to the antenna 32. Therefore, the signal processing apparatus 10 can suitably transmit the magnetic field 37 of the second carrier to the non-contact IC card 2 by using the antenna 32. The magnetic field 37 of the second carrier is amplified and thus, a sufficient communication distance can be ensured between the signal processing apparatus 10 and the non-contact IC card 2.

When the second carrier modulated with the transmission data is received by using the antenna 21, the non-contact IC card detects transmission data by demodulating a second carrier signal and performs predetermined processing in accordance with the transmission data. Then, the non-contact IC card 2 generates return data to the reader writer 1 based on the processing result and performs load modulation to change the impedance (load) of the antenna 21 based on the return data before transmitting the return data to the signal processing apparatus 10.

Next, the antenna 32 of the signal processing apparatus 10 receives the return data returned by the load modulation of the antenna 21 from the non-contact IC card 2 (S120). Further, the detection circuit 56 detects return data from the non-contact IC card 2 by detecting a feeble change in current flowing through the antenna 32 and the amplifier circuit 57 amplifies a signal of the return data detected by the detection circuit 56 (S122).

Next, the digital processing circuit 55 performs predetermined digital processing (such as waveform shaping, filtering processing, FIFO and buffering processing) on a signal of the amplified return data (S124). Further, the digital processing circuit 55 verifies that the return data is non-contact communication data based on the Sync code, Stat bit/frame or the like contained in the return data (S126) and if the verification is completed, the processing proceeds to steps S128 and S130 below.

If the communication method is different between the reader writer 1 and the non-contact IC card 2, the digital processing circuit 55 changes the data structure of return data according to the communication method of the reader writer 1, which is the return destination, if necessary (S128). Accordingly, the communication method of return data can be changed from the communication method (for example, TypeA) supported by the non-contact IC card 2, which is the return source, to the communication method (for example, FeliCa (registered trademark)) supported by the reader writer 1, which is the return destination.

Then, the load modulation circuit 58 of the signal processing apparatus 10 performs load modulation to change the load (impedance) of the antenna 31 based on the digitally processed return data in S124 (S130) to return the return data to the reader writer 1 by using the antenna 31 (S132). Since the magnetic body 34 and the metal body 33 are present on the rear side of the antenna 31, like the above case, the antenna 31 can suitably transmit the return data to the reader writer 1 without being affected by the magnetic field 37 of the second carrier emitted by the antenna 32.

As a result, the reader writer 1 receives the return data returned by the load modulation of the antenna 31 from the signal processing apparatus 10 by using the antenna 11 and detects transmission data from the signal processing apparatus 10 by detecting a feeble change in current flowing through the antenna 11. Then, the reader writer 1 performs predetermined processing based on the return data and if other transmission data (such as commands and service data) should be retransmitted to the non-contact IC card 2, the processing S100 to S132 is repeated.

5. APPLICATION EXAMPLE

Figure 7:
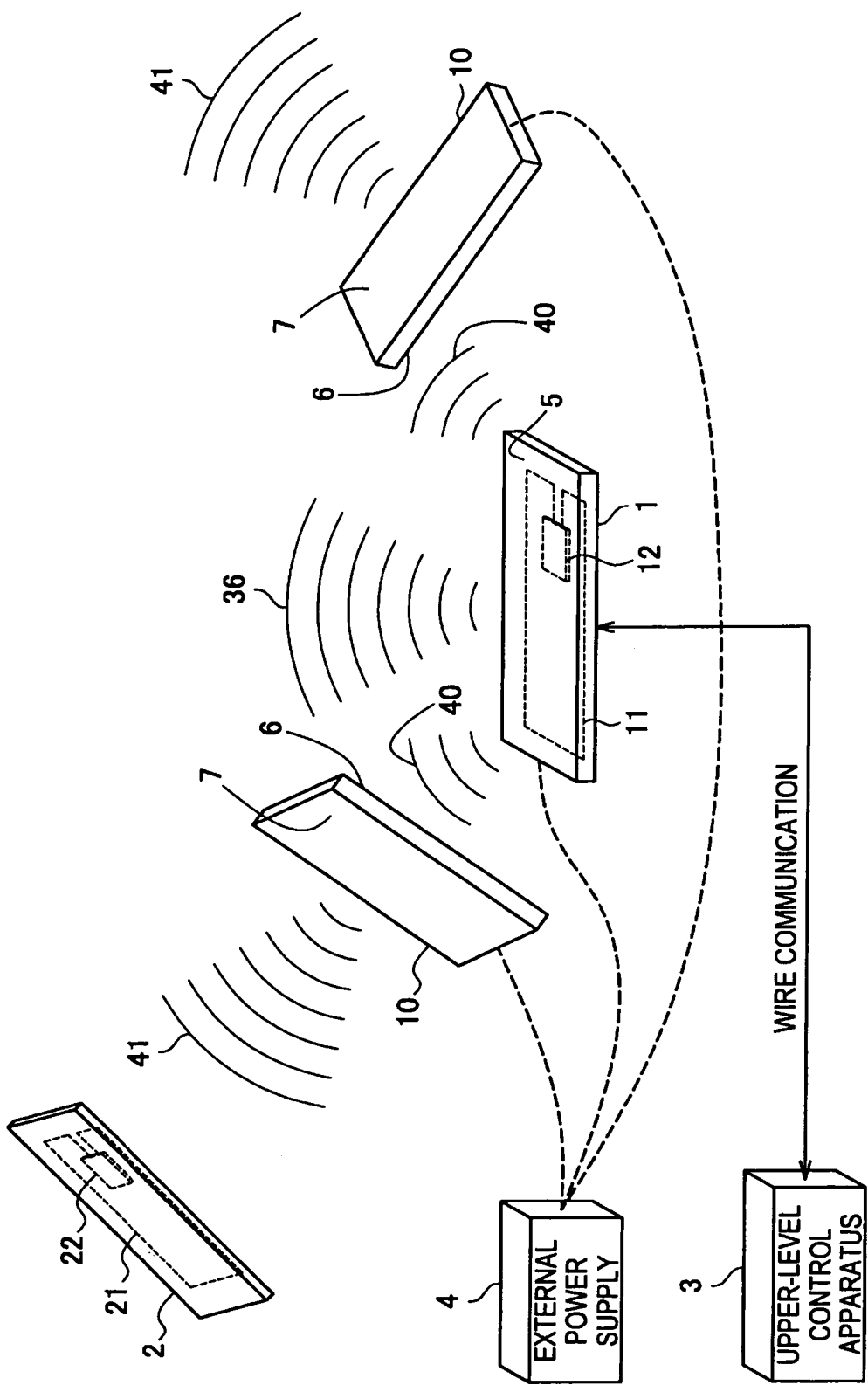
FIG. 7 is a schematic diagram showing a communication system in which a plurality of signal processing apparatuses is arranged while tilted with respect to the reader writer.

Next, an application example of the signal processing apparatus 10 according to the present embodiment will be described with reference to FIG. 7. FIG. 7 is a schematic diagram showing a communication system in which a plurality of the signal processing apparatuses 10 is arranged by being tilted with respect to the reader writer 1.

A booster antenna in the related art described in Japanese Patent Application Laid-Open Nos. 2005-323019, 2008-306689, and 2000-138621 has an issue that little effect of extending the communication distance in a horizontal direction with respect to a communication surface 5 of the reader writer 1 is achieved. The magnetic field 36 generated by the reader writer 1 spreads in a direction perpendicular to the communication surface and thus, the magnetic field can be expanded in the horizontal direction with respect to the communication surface 5 by enlarging the aperture (loop surface area) of the antenna coil of the reader writer 1. However, physical constraints are imposed on the reader writer 1 in terms of size. Moreover, there is also an issue that even if a booster antenna in the related art is used, the communication distance extended in the horizontal direction with respect to the communication surface 5 of the reader writer 1 is shorter than the communication distance extended in the vertical direction.

To solve such issues, in the present embodiment, the signal processing apparatus 10 is arranged, as shown in FIG. 7, by being tilted with respect to the communication surface 5 of the reader writer 1 so that communication surfaces 6 and 7 (loop surfaces) of the antennas 31 and 32 of the signal processing apparatus 10 are tilted with respect to the communication surface (loop surface) of the antenna 11 of the reader writer 1. The number of the signal processing apparatuses 10 to be arranged may be one or more. Accordingly, the signal processing apparatus 10 receives a feeble magnetic field 40 of the first carrier generated in a direction tilted with respect to the communication surface 5 of the reader writer 1 and can retransmit a strong magnetic field 41 of the second carrier obtained by amplifying the magnetic field 40 to the non-contact IC card 2.

Therefore, as shown in FIG. 7, even if the non-contact IC card 2 is positioned apart from the communication surface 5 of the reader writer 1 and arranged by being tilted with respect to the communication surface 5, the magnetic field 41 of sufficient magnetic field intensity and power can be supplied to the non-contact IC card 2 by relaying communication between the reader writer 1 and the non-contact IC card 2 through the signal processing apparatus 10.

Consequently, a communication area around the reader writer 1 can be expanded by tilting and arranging a plurality of the signal processing apparatuses 10. Particularly, the communication distance in the horizontal direction with respect to the communication surface 5 of the reader writer 1 can sufficiently be extended so that the degree of freedom of the position of the non-contact IC card 2 when the non-contact IC card 2 is held over the reader writer 1 can be improved. Therefore, according to the signal processing apparatus 10 in the present embodiment, the communication distance can significantly be extended compared with a method in the related art and also the need for examining technical restrictions is eliminated and a communication area can easily be expanded only by installing the signal processing apparatus 10. Also, the antenna can be made smaller, saving space.

6. CONCLUSION

In the foregoing, the signal processing apparatus 10 according to the present embodiment and the signal processing method using the signal processing apparatus 10 have been described in detail. The signal processing apparatus 10 according to the present embodiment includes the two antennas 31 and 32 corresponding to the reader writer 1 and the non-contact IC card 2, respectively. Further, the metal body 33 to prevent mutual interference between the magnetic fields 36 and 37 and the magnetic body 34 to reduce attenuation of the magnetic fields 36 and 37 are arranged between these antennas 31 and 32. The signal processing apparatus 10 is connected to the external power supply 4 and uses external power supplied from the external power supply 4 to amplify the first carrier received from the reader writer 1 and thus, the second carrier of strong magnetic field intensity can be transmitted to the non-contact IC card 2. Then, the signal processing apparatus 10 receives the first carrier and transmission data from the reader writer 1 by using the antenna 31 and retransmits the second carrier obtained by amplifying the first carrier and the transmission data to the non-contact IC card 2 by using the antenna 32. The signal processing apparatus 10 also receives return data from the non-contact IC card 2 by using the antenna 32 and re-returns the return data to the reader writer 1 by using the antenna 31.

With the above configuration, the signal processing apparatus 10 can solve issues of a booster antenna in the related art and can significantly extend the communication distance of the reader writer 1. For example, as shown in FIG. 1, even if the communication distance of the existing reader writer 1 of an entry/departure control apparatus is 50 mm, the communication distance can be extended by 100 mm or more by installing the signal processing apparatus 10 adjacent to the existing reader writer 1.

Also, even if resonance and coupling phenomena are already maximally adjusted between the existing reader writer 1 and the non-contact IC card 2, the communication distance of the reader writer 1 can practically be extended by installing the signal processing apparatus 10.

The signal processing apparatus 10 is structured to amplify a carrier by using the external power supply 4 so that the magnetic field 37 of a carrier transmitted to the non-contact IC card 2 can be made sufficiently strong. Therefore, shortening of the communication distance of the reader writer 1 caused by conditions of an external metal body or antenna coil can be prevented.

Further, the communication distance can easily be extended only by installing the signal processing apparatus 10 according to the present embodiment around the existing reader writer 1. Thus, the installation of the signal processing apparatus 10 according to the present embodiment is very easy and communication performance of the reader writer 1 can be improved without modifying or replacing the existing reader writer 1.

Further, design values (for example, the inductance, capacitance, coupling coefficient, and resonance frequency) of the antennas 31 and 32 of the signal processing apparatus 10 according to the present embodiment can freely be decided based on the signal processing apparatus 10 alone. Thus, when the signal processing apparatus 10 is designed, there is no need to adjust design values of the signal processing apparatus 10 based on results of measuring the resonance frequency, inductance, capacitance, antenna shape, and degree of coupling of the antenna 11 of the existing reader writer 1 and the antenna 21 of the non-contact IC card 2. Therefore, the installation is made very easy and the signal processing apparatus 10 can be installed easily.

Also, according to the signal processing apparatus 10 in the present embodiment, communication specifications (communication performance and the communication method and the like) of the reader writer 1 and installation conditions thereof can easily be changed while maintaining compatibility without changing the interface between the reader writer 1 and the non-contact IC card 2 and internal encryption/data formats. Therefore, the signal processing apparatus 10 according to the present embodiment can also be applied to change specifications (for example, to change the communication method, extend the communication distance, amplify the magnetic field intensity, enhance receiving performance, or upgrade a communication dead zone) of the existing reader writer 1. Particularly, if the cost of the existing reader writer 1 is high (for example, a SAM chip or an application CPU is mounted), specifications of the reader writer 1 can be added or changed inexpensively by using the signal processing apparatus 10. Moreover, the existing reader writer 1 can be used unchanged and thus, specifications of non-contact communication can advantageously be changed while maintaining compatibility of the communication interface with the higher-level control apparatus 3.

It should be understood by those skilled in the art that various modifications, combinations, sub-combinations and alterations may occur depending on design requirements and other factors insofar as they are within the scope of the appended claims or the equivalents thereof.

For example, the two antennas 31 and 32 of the signal processing apparatus 10 are arranged in parallel with each other in the above embodiment, but the present invention is not limited to such an example. For example, the antenna 32 may be arranged by being tilted with respect to the antenna 31 or at right angles thereto. Accordingly, the direction of the magnetic field 36 received by the antenna 31 from the reader writer 1 and the direction of the magnetic field 37 transmitted by the antenna 31 to the non-contact IC card 2 can be made different. Therefore, the signal processing apparatus 10 can change the direction of the magnetic field 36 of the first carrier generated by the reader writer 1 to another direction before the magnetic field 36 is communicated to the non-contact IC card 2.

What is claimed is:

1. A signal processing apparatus configured to be arranged near a reader writer and to enable non-contact communication between the reader writer and a non-contact IC card, comprising:

a first antenna to perform the non-contact communication with the reader writer;

a second antenna installed adjacent to the first antenna to perform the non-contact communication with the non-contact IC card;

a metal body that is arranged between the first antenna and the second antenna and blocks a magnetic field between the first antenna and the second antenna;

a first magnetic body arranged between the first antenna and the metal body, and a second magnetic body arranged between the second antenna and the metal body;

an amplification unit that amplifies a carrier wave;

a modulation unit that modulates the carrier wave, and a load modulation unit that changes an impedance of the first antenna, wherein the signal processing apparatus receives a first carrier wave modulated with first data transmitted to the non-contact IC card from the reader writer by using the first antenna, generates a second carrier wave by amplifying the first carrier wave by the amplification unit, modulates the second carrier wave with the first data by the modulation unit, transmits the second carrier wave modulated with the first data to the non-contact IC card by using the second antenna, receives second data returned by load modulation of an antenna of the non-contact IC card from the non-contact IC card by using the second antenna, and transmits the second data to the reader writer by performing the load modulation that changes the impedance of the first antenna by the load modulation unit based on the second data, and in which each of the first antenna and the second antenna is configured as a loop antenna and arranged such that a communication or loop surface of the first antenna is parallel to a communication or loop surface of the second antenna, and in which when the signal processing apparatus is arranged near the reader writer, each of the loop surface of the first antenna and the loop surface of the second antenna is parallel to a communication surface of the reader writer, said signal processing apparatus further comprising a power generating circuit to generate power for use therein by mixing internal power obtained from a magnetic field from the reader writer and external power obtained from an external power supply in a predetermined ratio, in which the predetermined ratio of internal power to external power is within a ratio range of 1:3 to 1:20.

2. The signal processing apparatus according to claim 1, further comprising:
a digital processing unit that digitally processes the first data and the second data,
wherein the digital processing unit changes a communication method of the first data received from the reader writer from a first communication method supported by the reader writer to a second communication method supported by the non-contact IC card and changes the communication method of the second data received from the non-contact IC card from the second communication method supported by the non-contact IC card apparatus to the first communication method supported by the reader writer.

3. The signal processing apparatus according to claim 1, further comprising:
a detection unit that detects a signal of the second data generated in the second antenna by the load modulation of the antenna of the non-contact IC card; and
a receiving amplification unit that amplifies the signal of the second data detected by the detection unit,
wherein receiving performance of the second data by the detection unit and the receiving amplification unit is adjusted to be higher than the receiving performance of the second data by the reader writer.

4. The signal processing apparatus according to claim 1, wherein a degree of modulation when the second carrier wave is modulated with the first data by the modulation unit is adjusted to be different from a degree of modulation when the first carrier wave is modulated with the first data by the reader writer in accordance with an environment in which the signal processing apparatus is used or specifications of the non-contact IC card.

5. The signal processing apparatus according to claim 1, further comprising:
a rectifying unit that rectifies the first carrier wave received by the first antenna.

6. A signal processing method for use by a signal processing apparatus arranged near a reader writer to enable non-contact communication between the reader writer and a non-contact IC card, comprising the steps of:
receiving a first carrier wave modulated with first data transmitted from the reader writer to the non-contact IC card by using a first antenna;
generating a second carrier wave by amplifying the first carrier wave;
modulating the second carrier wave with the first data;
transmitting the second carrier wave modulated with the first data to the non-contact IC card by using a second antenna installed adjacent to the first antenna such that a metal body is present between the first antenna and the second antenna and such that a first magnetic body is arranged between the first antenna and the metal body, and a second magnetic body is arranged between the second antenna and the metal body;
receiving second data returned by load modulation of an antenna of the non-contact IC card from the non-contact IC card by using the second antenna; and
transmitting the second data to the reader writer by performing the load modulation that changes an impedance of the first antenna based on the second data, and
in which each of the first antenna and the second antenna is configured as a loop antenna and arranged such that a communication or loop surface of the first antenna is parallel to a communication or loop surface of the second antenna, and
in which when the signal processing apparatus is arranged near the reader writer, each of the loop surface of the first antenna and the loop surface of the second antenna is parallel to a communication surface of the reader writer, and
said signal processing method further comprising the step of generating power for use by the signal processing apparatus by mixing internal power obtained from a magnetic field from the reader writer and external power obtained from an external power supply in a predetermined ratio, in which the predetermined ratio of internal power to external power is within a ratio range of 1:3 to 1:20.

* * * * *